(12) United States Patent
Fujikawa et al.

(10) Patent No.: US 6,836,140 B2
(45) Date of Patent: Dec. 28, 2004

(54) METHOD FOR MANUFACTURING A DISPLAY DEVICE, AND DISPLAY DEVICE SUBSTRATE

(75) Inventors: Takashi Fujikawa, Nara (JP); Yoshiharu Kataoka, Suita (JP); Hitoshi Matsumoto, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 63 days.

(21) Appl. No.: 09/983,947

(22) Filed: Oct. 26, 2001

(65) Prior Publication Data

US 2002/0079920 A1 Jun. 27, 2002

(30) Foreign Application Priority Data

Oct. 31, 2000 (JP) .................................. 2000-333947
Oct. 17, 2001 (JP) .................................. 2001-319639

(51) Int. Cl.[7] ............................................. G01R 31/00
(52) U.S. Cl. ..................................................... 324/770
(58) Field of Search ............................ 324/770; 438/17, 438/18; 257/48

(56) References Cited

U.S. PATENT DOCUMENTS

2001/0020988 A1 * 9/2001 Ohgiichi et al. .............. 349/54

FOREIGN PATENT DOCUMENTS

| JP | 1-30439 | * 12/1989 | ........... H01L/21/66 |
| JP | 8-190087 A | 7/1996 | ......... G02F/1/1333 |
| JP | 2000-180807 | * 6/2000 | ............. G02F/1/13 |

* cited by examiner

Primary Examiner—Evan Pert
(74) Attorney, Agent, or Firm—Nixon & Vanderhye P.C.

(57) ABSTRACT

A TEG (Test Element Group) block 1 includes a TFT (Thin Film Transistor) test element and a capacitance test element that are arranged adjacent to each other, and six test terminals. A TEG block 2 includes a resistance test element and a capacitance test element that are arranged adjacent to each other, and six test terminals. In these TEG blocks, the test terminals are arranged with the same pattern. Each of the test elements in each TEG block is connected to at least one of a plurality of test terminals included in that TEG block.

The test elements can be efficiently formed on the substrate in view of the space on a display device substrate or the preference of characteristics to be evaluated. Moreover, characteristics of each test element can be conducted with a common probe regardless of the type of display device.

18 Claims, 18 Drawing Sheets

GATE SHEET RESISTANCE (Rs1)

SOURCE (DRAIN) SHEET RESISTANCE (Rs2, Rs4)

RESIDUAL-GATE-FILM SHEET RESISTANCE (Rs3)

PICTURE-ELEMENT ELECTRODE SHEET RESISTANCE (Rs5)

n⁺ FILM SHEET RESISTANCE (Rs6)

DRAIN-GATE CONTACT RESISTANCE (Rc1)

PICTURE ELEMENT ELECTRODE-DRAIN CONTACT RESISTANCE (Rc2)

FIG. 10A   GATE INSULATION FILM (WITH AO) CAPACITANCE (C1)
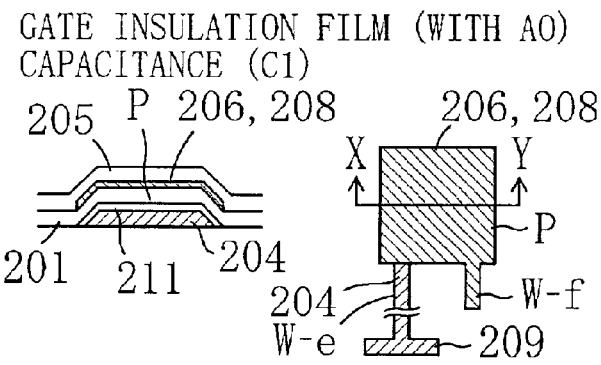
FIG. 10B   GATE INSULATION FILM CAPACITANCE (C2)
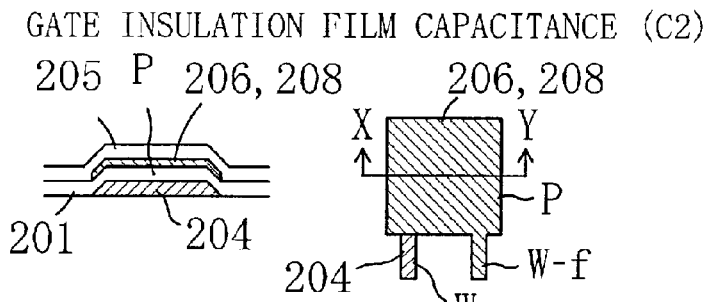
FIG. 10C   PASSIVATION FILM CAPACITANCE (C3)
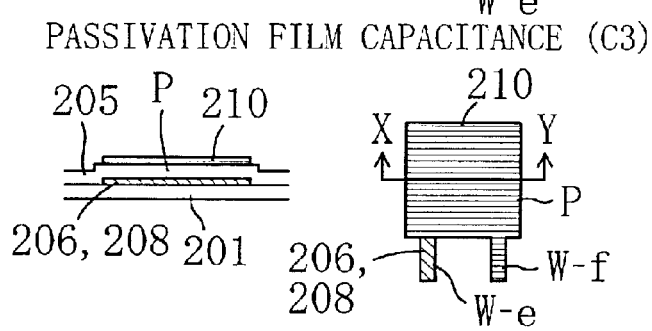
FIG. 10D   CAPACITANCE OF PASSIVATION FILM AND ORGANIC INSULATION FILM (C4)
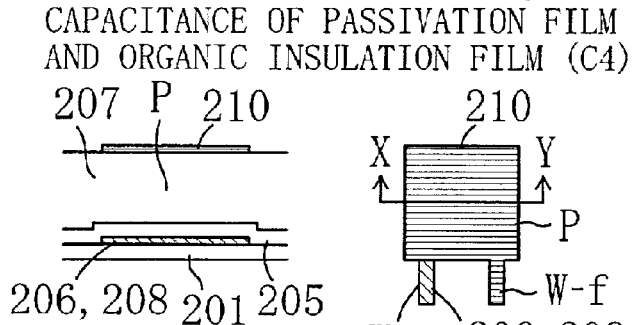
FIG. 10E   ORGANIC INSULATION FILM CAPACITANCE
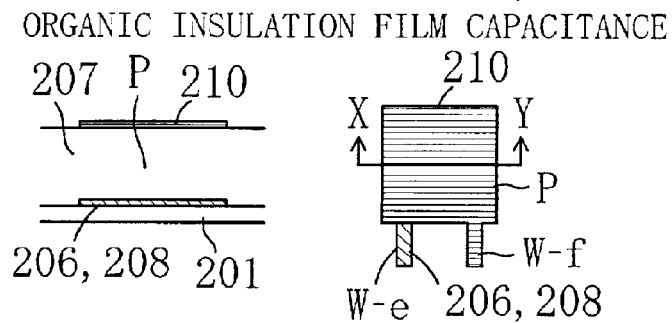

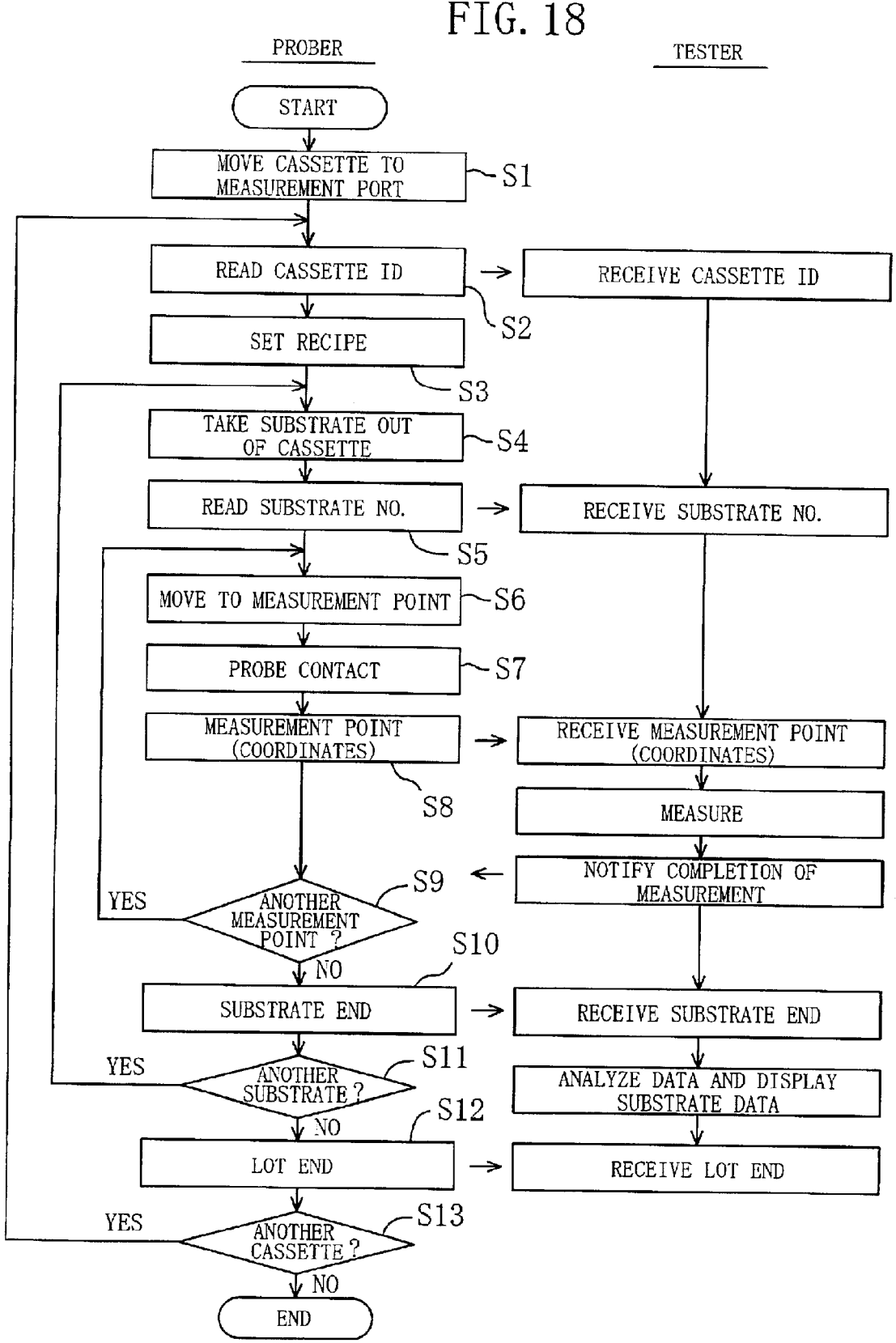

METHOD FOR MANUFACTURING A DISPLAY DEVICE, AND DISPLAY DEVICE SUBSTRATE

BACKGROUND OF THE INVENTION

1. Field of the Invention

The present invention generally relates to a method for manufacturing a display device, and a substrate for the same. More particularly, the present invention relates to a method for manufacturing an active matrix liquid crystal display device (LCD) such as LCDs of TFT (Thin Film Transistor) type and MIM (Metal-Insulator-Metal) type, and a substrate used to manufacture the same.

2. Description of the Background Art

Recent improvement in performance of the display devices requires stricter management of the device characteristics. Management of the device characteristics is necessary for quality control, early detection of defective substrates, and prevention of outflow of such detective substrates into the process. For example, a TFT substrate of the LCD is fabricated by the process including a plurality of thin-film deposition steps and a plurality of patterning steps. In order to evaluate the manufacturing process and the like, characteristics such as TFT characteristics, bus line resistance and contact resistance are evaluated. One such evaluation method is to provide on a TFT substrate a TEG (Test Element Group) including test elements according to the purpose of evaluation, and measure characteristics of each test element by making a probe in contact with a terminal connected to that test element (for example, see Japanese Laid-Open Publication No. 8-190087, and in particular, FIGS. 1 and 2 thereof).

Since there exist various types of LCDs, kinds of characteristics to be evaluated and the number of such characteristics vary depending on the type of the LCD. In addition, kinds of test elements of the TEG and the number of such test elements also vary depending on the type of the LCD. For example, in the case of a TFT substrate having an organic insulation film entirely covering a picture element, characteristics associated with the organic insulation film are evaluated in addition to the characteristics that are evaluated for a TFT substrate having no organic insulation film. Moreover, since there are many sizes of the LCDs, the number of TEGs and their positions may be limited from the standpoint of the design. Recently, in order to manufacture many types of LCDs efficiently, the LCDs having different panel sizes are sometimes manufactured from the same mother substrate in the same production line. In other cases, the LCDs having different panel sizes are manufactured from the respective mother substrates having the same size. Since the position of the TEG and characteristics to be tested vary depending on the type of the LCD, separates probes are required for the respective types of the LCDs. In other words, expensive probes must be prepared in order to test the respective types of the LCD. Accordingly, a plurality of test apparatuses must be prepared for the respective types of the LCDs. Alternatively, when the same test apparatus is used, a probe must be replaced every time the type of the LCD is changed, complicating the manufacturing process. Moreover, the time to replace the probe is required, reducing the production efficiency.

In the recent display devices, the space for the TEG on the substrate has been increasingly reduced. The first reason for this is to reduce the production costs. In order to reduce the production costs, as many substrates as possible must be obtained from a single mother substrate. This requires the substrate area other than the display portion to be reduced as much as possible. Recently, the display devices tend to be specially developed for the medium- or small-size applications. Therefore, this is remarkable particularly in a small-size substrate for use in mobile products. The second reason is narrowing of the frame in the recent display devices. In order to narrow the frame portion (the portion other than the display portion) as much as possible, required terminals (such as drivers) and TEG must be formed in a narrow region. Accordingly, there is a need for development of a TEG efficiently integrating the test elements.

It is an object of the present invention to provide a display device substrate capable of being inexpensively evaluated with high operating efficiency, and thus achieving improved production efficiency. It is another object of the present invention to provide a method for manufacturing a display device with high production efficiency using a production line for manufacturing different types of display devices. In other words, it is another object of the present invention to efficiently manufacture various display devices in the same production line.

SUMMARY OF THE INVENTION (1) According to the present invention, a method for manufacturing a display device using a production line for manufacturing at least two different types of display devices includes the steps of: fabricating a circuit substrate including a display device circuit of the display device and a plurality of test elements for evaluating characteristics of a circuit element forming the display device circuit; and evaluating the characteristics of the circuit element, the evaluating step including the step of measuring characteristics of the plurality of test elements formed on the circuit substrate, wherein each of the plurality of test elements is connected to at least one of a plurality of test terminals arranged with a common pattern in the at least two different types of display devices, and the measuring step is conducted with a common probe being in contact with the at least one test terminal regardless of the type of the display device.

Note that the phrase "different types" as used herein implies not only the difference in size of the display device and the difference in type of the circuit element forming the display device circuit but also the difference in manufacturing process of the circuit element, and the like. The term "circuit substrate" refers to a substrate having a plurality of circuit elements formed thereon, such as a TFT substrate and an MIM substrate (hereinafter, sometimes referred to as "display device substrate"). The term "test element" indicates an element formed in a free region on the substrate other than the region occupied by the display device circuit. The term "display device circuit" indicates the overall circuitry required for operation as a display device, and includes not only picture-element electrodes in the display region, switch elements such as TFTs, wiring portions such as bus lines, and terminal portions, but also driving circuitry for driving the switch elements. The phrase "a plurality of test terminals arranged with a common pattern" means that a plurality of test terminals provided in each of at least two different types of display devices are arranged with partially or completely the same pattern.

(2) In the manufacturing method according to (1), the circuit substrate includes a first test element group including at least two test elements for evaluating different characteristics from each other, the first test element group being connected to at least one of a plurality of first test terminals, and the plurality of first test terminals being included in the plurality of test terminals arranged with the common pattern.

(3) In the manufacturing method according to (2), the circuit substrate further includes a second test element group including at least two additional test elements for evaluating different characteristics from each other, the second test element group being connected to at least one of a plurality of second test terminals arranged with the same pattern as that of the plurality of first test terminals, and in the measuring step, the step of making the common probe in contact with the at least one of the plurality of first test terminals simultaneously is conducted independently of the step of making the common probe in contact with the at least one of the plurality of second test terminals simultaneously.

(4) In the manufacturing method according to (2), the at least two test elements include a resistance test element and a capacitance test element, the plurality of first test terminals are six first test terminals, the resistance test element is connected to four of the six first test terminals, and the capacitance test element is connected to the remaining two first test terminals of the six first test terminals.

(5) In the manufacturing method according to (4), the circuit substrate further includes a second test element group including at least two additional test elements for evaluating different characteristics from each other, the at least two additional test elements include an additional resistance test element and an additional capacitance test element, and the second test element group is connected to a plurality of second test terminals arranged with the same pattern as that of the plurality of first test terminals.

(6) In the measuring step of the manufacturing method according to (5), the step of making the common probe in contact with the plurality of first test terminals simultaneously is conducted independently of the step of making the common probe in contact with the plurality of second test terminals simultaneously.

(7) In the manufacturing method according to (1), the step of evaluating the characteristics of the circuit element includes the steps of specifying a type of the circuit substrate out of the at least two different types, obtaining information on measurement conditions according to the specified type and information on arrangement of the plurality of test terminals, and moving the common probe relative to the circuit substrate based on the obtained information on the measurement conditions and arrangement.

(8) In the manufacturing method according to (1), the step of fabricating the circuit substrate is a step of forming a plurality of circuit substrates on a mother substrate, and the step of evaluating the characteristics is sequentially conducted for the plurality of circuit substrates.

(9) In the manufacturing method according to (3), the first test element group and the second test element group include in common a test element for measuring the same characteristics, each of the test elements includes an element portion to be measured and a wiring portion for connecting the element portion to the test terminal, and the respective element portions of the test elements for measuring the same characteristics have different areas, the method further includes the step of: calculating a regression coefficient from respective measurement results of the test elements and the respective areas of the element portions.

A display device substrate according to the present invention includes: a display device circuit of a display device; and a plurality of test elements for evaluating characteristics of a circuit element forming the display device circuit, wherein the plurality of test elements include at least a first test element group and a second test element group each including a resistance test element and a capacitance test element that are arranged adjacent to each other, the first test element group is connected to at least one of a plurality of first test terminals arranged with a prescribed pattern, and the second test element group is connected to at least one of a plurality of second test terminals arranged with the same pattern as that of the plurality of first test terminals.

In the display device substrate of the present invention, the plurality of first test terminals are six first test terminals, the resistance test element is connected to four of the six first test terminals, and the capacitance test element is connected to the remaining two first test terminals of the six first test terminals.

The "display device substrate" of the present invention is a substrate having a size adaptable to an intended display device, and is typically fabricated by cutting a mother substrate having a plurality of display device substrates formed thereon into a prescribed size.

According to the present invention, a measuring system for measuring characteristics of the plurality of test elements included in the display device substrate of the present invention includes: a probe including a plurality of contact portions arranged with the same pattern as that of the plurality of first test terminals on the display device substrate; a means for reading information attached to a cassette that contains a plurality of mother substrates each having a plurality of display device substrates formed thereon; a means for taking a mother substrate out of the cassette based on the information read by the reading means; a first determination means for determining whether or not there is any test element on the mother substrate, which has not been measured; a means for moving the probe relative to the test element on the display device substrate according to a type of the mother substrate, when the first determination means determines that there is a test element that has not been measured; a means for making the plurality of contact portions of the probe in contact with a plurality of test terminals including the terminal connected to the test element, and measuring characteristics of the test element; a second determination means for determining whether or not the cassette contains any mother substrate that has not been measured, when the first determination means determines that there is not any test element that has not been measured; a means for taking the mother substrate that has not been measured out of the cassette, when the second determination means determines that the cassette contains a mother substrate that has not been measured; a third determination means for determining whether there is any cassette that has not been measured, when the second determination means determines that the cassette does not contain any mother substrate that has not been measured; and a means for moving the cassette that has not been measured so as to allow the reading means to read the information, when the third determination means determines that there is a cassette that has not been measured.

Hereinafter, effects of the present invention will be described. In the method for manufacturing a display device according to the present invention, each of a plurality of test elements for evaluating characteristics of a circuit element forming a display device circuit is connected to at least one of a plurality of test terminals arranged with a common pattern in at least two different types of display devices. Moreover, characteristics of the plurality of test elements are measured with a common probe being in contact with the at least one test terminal regardless of the type of the display device. According to this manufacturing method, characteristics of the circuit element can be evaluated with the common probe regardless of the type of the display device. This eliminates the need to prepare a probe for every type of display device and to replace the probe according to the type of display device. Therefore, characteristics of the circuit element can be inexpensively evaluated with high operating efficiency, whereby the display device can be manufactured efficiently.

In the manufacturing method according to (2), the circuit substrate includes a first test element group including at least two test elements for evaluating different characteristics from each other. According to this manufacturing method, at least two different characteristics included in the first test element group can be evaluated with the common probe.

In the manufacturing method according to (3), the circuit substrate further includes a second test element group including at least two additional test elements for evaluating different characteristics from each other. The second test element group is connected to at least one of a plurality of second test terminals arranged with the same pattern as that of the plurality of first test terminals. In the measuring step, the step of making the common probe in contact with the at least one of the plurality of first test terminals simultaneously is conducted independently of the step of making the common probe in contact with the at least one of the plurality of second test terminals simultaneously. According to this manufacturing method, respective characteristics of the first test element group and the second test element group can be measured using the common probe. This eliminates the need to replace the probe for measurement of the respective characteristics of the first test element group and the second test element group. Thus, characteristics of the circuit element can be inexpensively evaluated with high operating efficiency, whereby the display device can be manufactured efficiently. Moreover, according to this manufacturing method, the probe is made in contact with the at least one of the test terminals simultaneously. Therefore, by using a set of at least two test elements included in each of the first test element group and the second test element group, i.e., a set of at least two test elements for evaluating different characteristics from each other, characteristics of at least two test elements can be measured with one probe contact operation for each test element group.

In the manufacturing method according to (4), the first test element group includes a resistance element and a capacitance test element, allowing for efficient evaluation of the characteristics of the circuit element. In particular, for a substrate such as a TFT substrate and an MIM substrate, not only the resistance but also the capacitance must be measured. Therefore, the first test element group including the resistance test element and the capacitance test element enables efficient measurement of the resistance and capacitance.

Moreover, in the manufacturing method according to (4), the resistance test element is connected to four of the six first test terminals, and the capacitance test element is connected to the remaining two first test terminals of the six first test terminals. According to this manufacturing method, the resistance test element is connected to four first test terminals. Therefore, resistance measurement accuracy is improved by a four-terminal method. Even when the resistance test element is replaced with a TFT test element, connecting the TFT test element to three of the four first test terminals enables measurement of characteristics of the TFT test element.

Six first test terminals are provided because the following advantages are obtained: first, connecting the resistance test element to the four first test terminals enables accurate measurement of metal sheet resistance. In other words, the metal sheet resistance can be measured by the four-terminal measurement method, enabling more accurate measurement of the sheet resistance than measurement using two terminals.

Second, the contact portions of the probe contacting the four test terminals connected to the resistance test element (hereinafter, sometimes referred to as resistance measuring terminals) can be provided separately from the contact portions of the probe contacting the two test terminals connected to the capacitance test element (hereinafter, sometimes referred to as capacitance measuring terminals). Therefore, the measuring apparatus can be prevented from being complicated, and reduction in measurement accuracy can be prevented. For example, if a probe having four contact portions contacting resistance measuring terminals are also used as a probe contacting two capacitance measuring terminals, switching between resistance measurement and capacitance measurement is required, complicating the measurement apparatus and also possibly reducing the measurement accuracy due to insertion of a switching device. In view of the increasing needs for fine display devices, reduction in measurement accuracy is highly problematic. Accordingly, it is desirable to use a probe having six separate contact portions, that is, four contact portions contacting the resistance measuring terminal and two contact portions contacting the capacitance measuring terminal. It is therefore desirable to provide six first test terminals contacting the probe.

Third, the four contact portions of the probe contacting the four resistance measuring terminals can also be used as contact portions for measuring the TFT test element. Since the TFT test element is connected to three test terminals, a probe having at least three contact portions is required in order to measure the TFT characteristics. For example, in the case where the TFT characteristics and the capacitance are measured using a probe having four contact portions, at least one contact portion must be used for measuring both the TFT characteristics and the capacitance. Therefore, switching between measurement of the TFT characteristics and capacitance measurement is required. On the other hand, in the case where the TFT characteristics and the capacitance are measured without switching between measurement of the TFT characteristics and capacitance measurement, a probe having five contact portions may be used. However, when the resistance and the capacitance are measured using this probe, only three contact portions can be assigned to resistance measurement. Therefore, the resistance cannot be measured by the four-terminal measurement method. Accordingly, in order to measure the resistance, capacitance and TFT characteristics accurately without switching, a probe having at least six contact portions is required, and therefore at least six test terminals contacting the contact portions of this probe are required.

It can be appreciated from the above advantages that six first test terminals, that is, combination of four resistance measuring terminals and two capacitance measuring terminals, are the minimum unit for improving measurement accuracy without complicating the measuring apparatus.

In the manufacturing method according to (5), the circuit substrate further includes a second test element group including at least two additional test elements for evaluating different characteristics from each other, and the at least two additional test elements include an additional resistance test element and an additional capacitance test element. The second test element group is connected to a plurality of second test terminals arranged with the same pattern as that of the plurality of first test terminals. According to this manufacturing method, at least two different characteristics, i.e., resistance and capacitance, can be evaluated for each of the first test element group and the second test element group by using the common probe in the manufacturing method according to (4).

Providing the minimum unit of test terminals, that is, combination of four test terminals connected to a resistance test element and two test terminals connected to a capacitance test element, enables characteristics to be evaluated in a versatile manner regardless of the type and size of the display device. For example, in the case of a small display device, the minimum required number of test element groups are configured from a resistance test element and a capacitance test element. Moreover, the minimum unit of test terminals, that is, six test terminals, is connected to both test elements included in each test element group. Since both test elements included in each test element group form the minimum test unit connected to the minimum unit of test terminals, the test element group can be formed even in a small region on the substrate without being subjected to positional limitations. In the case of a large display device, the use of an increased number of test element groups enables more detailed evaluation of the characteristics.

In the measuring step of the manufacturing method according to (6), the step of making the common probe in contact with the plurality of first test terminals simultaneously is conducted independently of the step of making the common probe in contact with the plurality of second test terminals simultaneously. According to this manufacturing method, the probe is made in contact with the at least one of the test terminals simultaneously. Therefore, by using a set of a resistance test element and a capacitance test element included in each of the first test element group and the second test element group, characteristics of the resistance test element and the capacitance test element can be measured with one probe contact operation for each test element group.

In the manufacturing method according to (7), the step of evaluating the characteristics of the circuit element includes the steps of specifying a type of the circuit substrate out of the at least two different types, obtaining information on measurement conditions according to the specified type and information on arrangement of the plurality of test terminals, and moving the common probe relative to the circuit substrate based on the obtained information on the measurement conditions and arrangement. According to this manufacturing method, characteristics of the circuit element can be successively evaluated for different type of circuit substrates by using the common probe.

In the manufacturing method according to (8), the step of fabricating the circuit substrate is a step of forming a plurality of circuit substrates on a mother substrate, and the step of evaluating the characteristics is sequentially conducted for the plurality of circuit substrates. According to this manufacturing method, the step of evaluating the characteristics can be sequentially conducted for the plurality of circuit substrates formed on the mother substrate by using the common probe.

In the manufacturing method according to (9), the first test element group and the second test element group include in common a test element for measuring the same characteristics. Each of the test elements includes an element portion to be measured and a wiring portion for connecting the element portion to the test terminal. The element portions of the test elements included in common in the first test element group and the second test element group have different areas between the first test element group and the second test element group. A regression coefficient is calculated from the measurement results of the respective test elements in the first test element group and the second test element group and the areas of the respective element portions in the first test element group and the second test element group. According to this manufacturing method, characteristics of the test elements included in common in different test element groups can be evaluated more accurately based on the measurement results of these test elements and the areas of the respective element portions of the test elements.

In the display device substrate of the present invention, the plurality of test elements include at least a first test element group and a second test element group each including a resistance test element and a capacitance test element that are arranged adjacent to each other. The first test element group is connected to at least one of a plurality of first test terminals arranged with a prescribed pattern, and the second test element group is connected to at least one of a plurality of second test terminals arranged with the same pattern as that of the plurality of first test terminals. According to this display device substrate, the resistance test element and the capacitance test element included in each of the first test element group and the second test element group are arranged adjacent to each other. Therefore, the resistance test element and the capacitance test element can be efficiently formed on the circuit substrate in view of the space on the substrate or the preference of characteristics to be evaluated. Moreover, the first test terminals and the second test terminals are arranged with the same pattern. Therefore, characteristics of the resistance test element and the capacitance test element included in each of the first test element group and the second test element group can be measured with the common probe.

In the display device substrate, the resistance test element is connected to four of the six first test terminals, and the capacitance test element is connected to the remaining two first test terminals of the six first test terminals. According to this display device substrate, the resistance test element is connected to four first test terminals. Therefore, resistance measurement accuracy is improved by a four-terminal method. Even when the resistance test element is replaced with a TFT test element, connecting the TFT test element to three of the four first test terminals enables measurement of characteristics of the TFT test element.

Providing the minimum unit of test terminals, that is, combination of four test terminals connected to a resistance test element and two test terminals connected to a capacitance test element, enables characteristics to be evaluated in a versatile manner regardless of the type and size of the display device. For example, in the case of a small display device, the minimum required number of test element groups are configured from a resistance test element and a capacitance test element. Moreover, the minimum unit of test terminals, that is, six test terminals, is connected to both test elements included in each test element group. Since both test elements included in each test element group form the minimum test unit connected to the minimum unit of test terminals, the test element group can be formed even in a small region on the substrate without being subjected to positional limitations. In the case of a large display device, the use of an increased number of test element groups enables more detailed evaluation of the characteristics.

The measuring system according to the present invention is a system for measuring characteristics of the plurality of test elements included in the display device substrate of the present invention, allowing for successive measurement using the common probe. This enables automated measurement rather than manual measurement, resulting in improved production efficiency.

BRIEF DESCRIPTION OF THE DRAWINGS

FIGS. 1A and 1B are diagrams illustrating a substrate 100 for a liquid crystal display device (LCD) according to a first embodiment of the present invention, wherein FIG. 1A is a plan view schematically showing the LCD substrate 100, and FIG. 1B is a plan view schematically showing the LCD substrate 100 having no TEG 105 formed thereon;

FIG. 3 is a plan view of a TEG 105a;

FIGS. 10A to 10E show plan views (on the right) of capacitance test elements, and cross-sectional views (on the left) taken along the line X-Y in the respective plan views;

FIGS. 17A and 17B are diagrams schematically illustrating an example of a measuring system including a probe, wherein FIG. 17A is a structural diagram illustrating connection between the probe and two measuring units, and FIG. 17B is a structural diagram illustrating the measuring system; and FIG. 18 is a diagram illustrating a flow (flowchart) of the measurement by the measuring system of FIG. 17.

DETAILED DESCRIPTION OF THE PREFERRED EMBODIMENTS

Hereinafter, embodiments of the present invention will be exemplarily described for a TFT-type active matrix liquid crystal display device (LCD) with reference to the accompanying drawings. It should be understood that the present invention is applicable to the LCDs other than the TFT-type LCD, such as an MIM-type active-matrix LCD. The present invention is also applicable to the display devices other than the LCDs, such as an organic EL (electroluminescence) display device.

(First Embodiment)

Figure 1A:
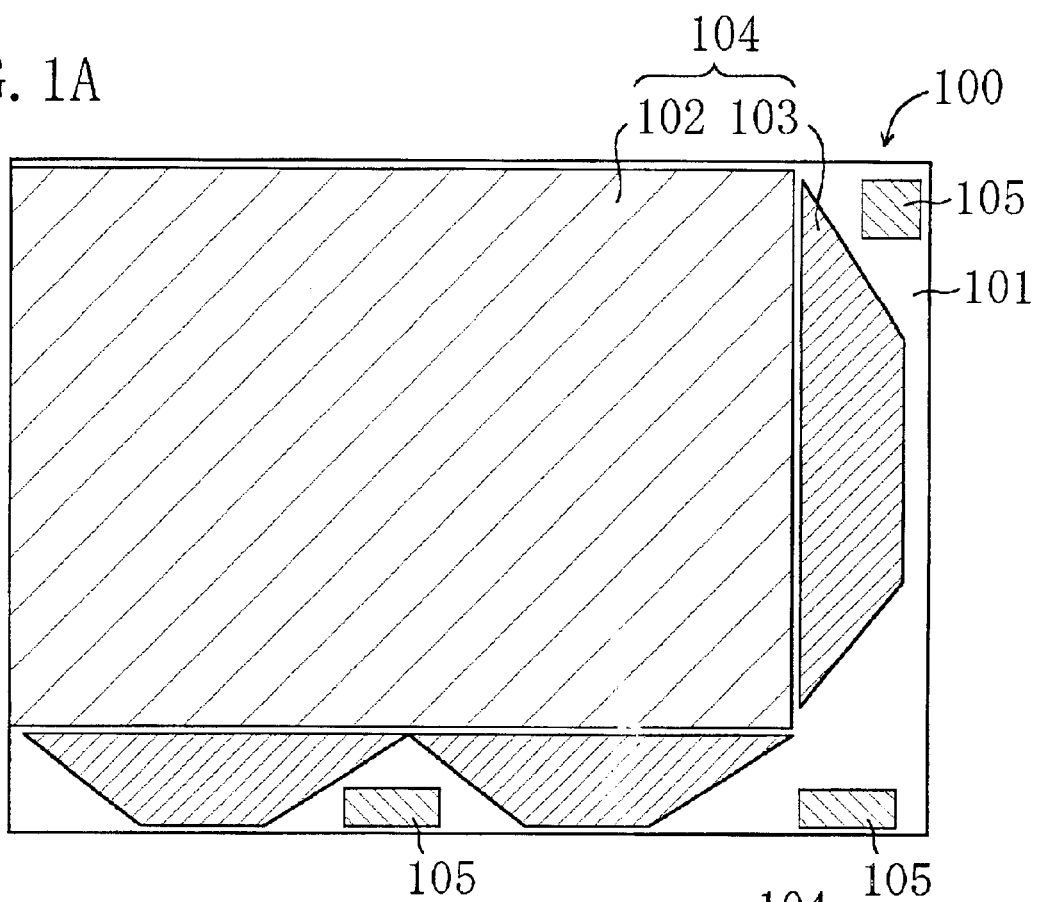

FIG. 1A is a plan view schematically showing a display device substrate 100 according to an embodiment of the present invention. A display device circuit 104 is formed on an insulating substrate 101 such as a glass substrate. The display device circuit 104 includes a display portion 102 including TFTs, and a region 103 located in the periphery of the display portion 102 and including terminal electrodes of scanning lines and signal lines for supplying a voltage to the TFTs.

A TEG 105 is formed on the insulating substrate 101. The TEG 105 is formed from a plurality of test elements and a plurality of test terminals. The plurality of test elements are elements for testing characteristics of the TFTs of the display device circuit 104. Note that the display device substrate 100 in FIG. 1A is typically fabricated by cutting a mother substrate (not shown) having a plurality of display device substrates 100 formed thereon into a prescribed size.

Figure 1B:
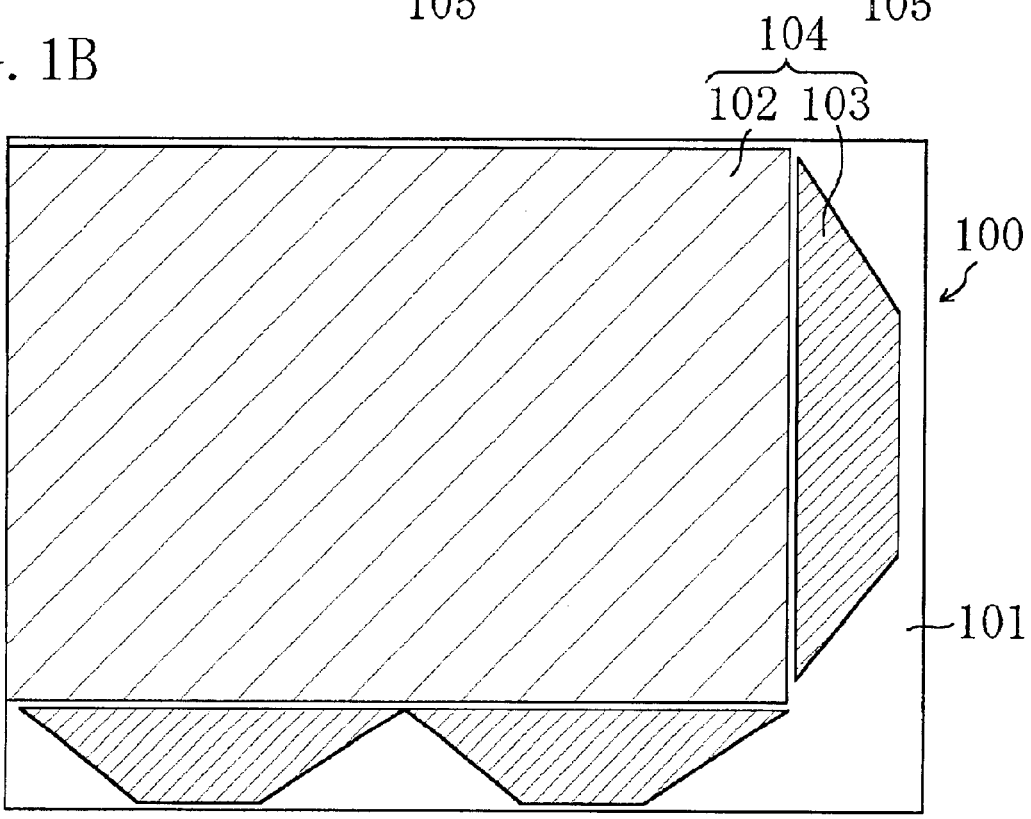

The TEG 105 is formed in view of the size and arrangement of the display device circuit 104 formed on the insulating substrate 101. FIG. 1B is a plan view schematically showing the display device substrate 100 having no TEG 105 formed thereon. The TEG 105 can be formed intensively at one position or separately at several positions within a part of a region on the insulating substrate 101 other than the region occupied by the display device circuit 104 (hereinafter, sometimes referred to as "free region"). In FIG. 1A, the TEG 105 is formed at three separate positions within the free region on the insulating substrate 101.

Figure 2:
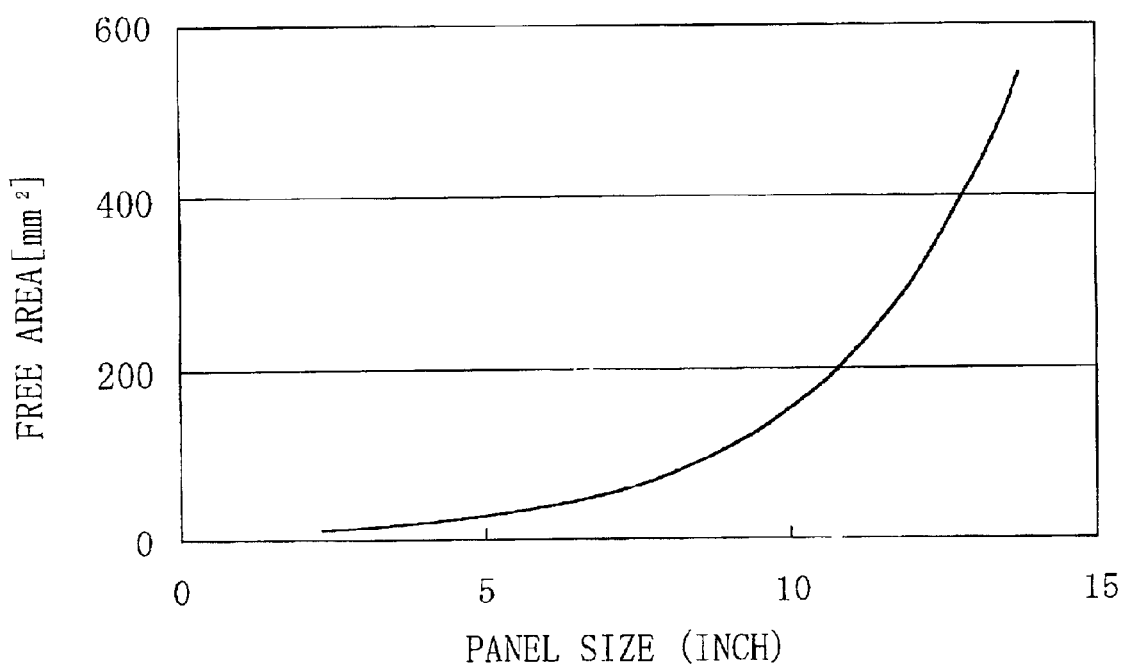
FIG. 2 is a graph showing an example of the relation between the panel size of the LCD and the area of a free region.

FIG. 2 is a graph showing an example of the relation between the panel size of the LCD and the area of the free region. As can be seen from FIG. 2, as the panel size of the LCD decreases, the area of the free region decreases sharply. Accordingly, the number of characteristics to be tested is adjusted in view of the area of the free region, and the TEG 105 is designed according to the characteristics to be tested. For example, in the case of a small LCD with a small free area, the TEG 105 corresponding to the essential, basic characteristics to be tested is arranged preferentially, and the TEG 105 corresponding to the remaining characteristics to be tested is arranged in view of the area of the remaining free region and the preference of the remaining characteristics.

Figure 3:
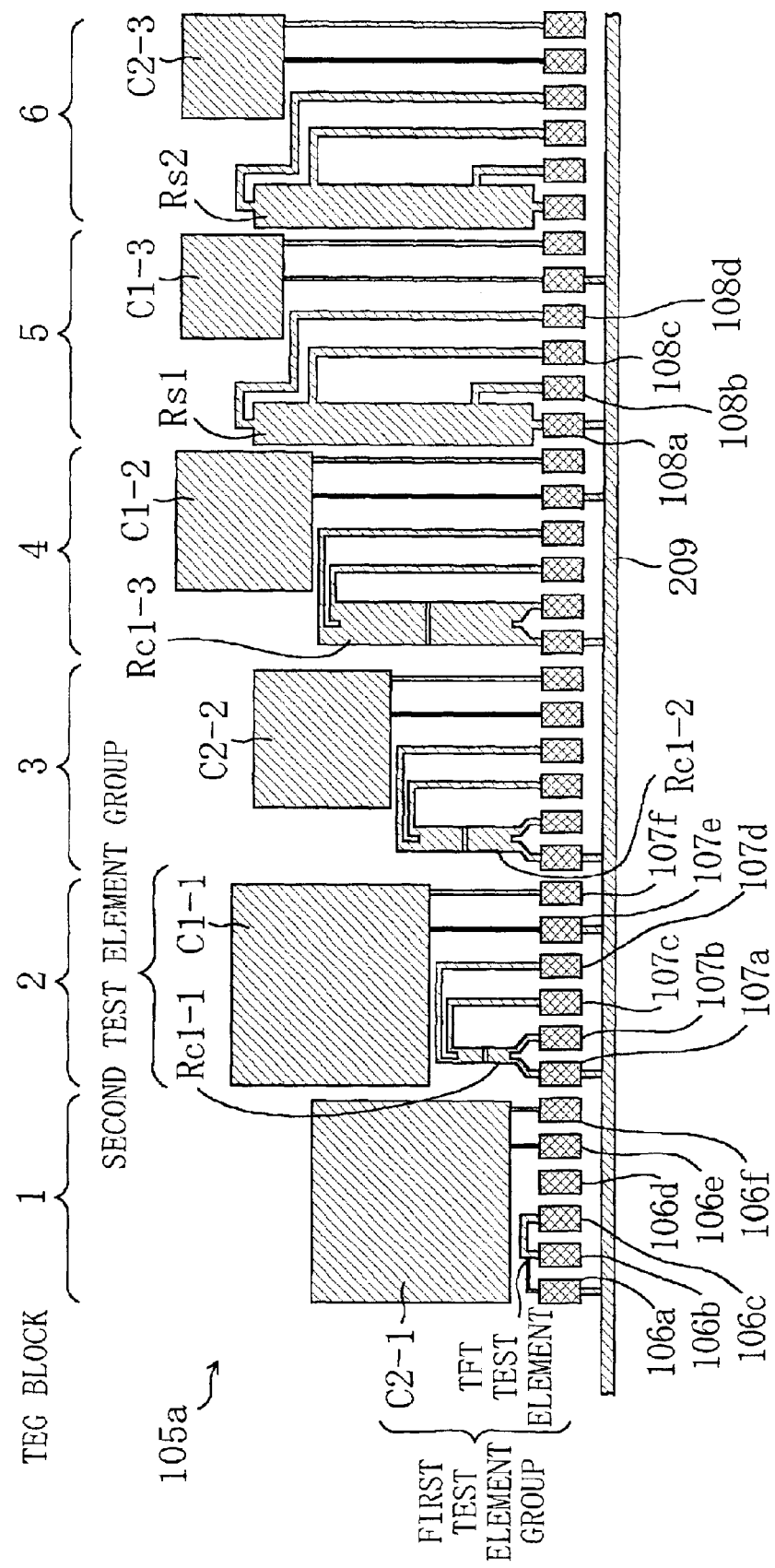
Figure 4:
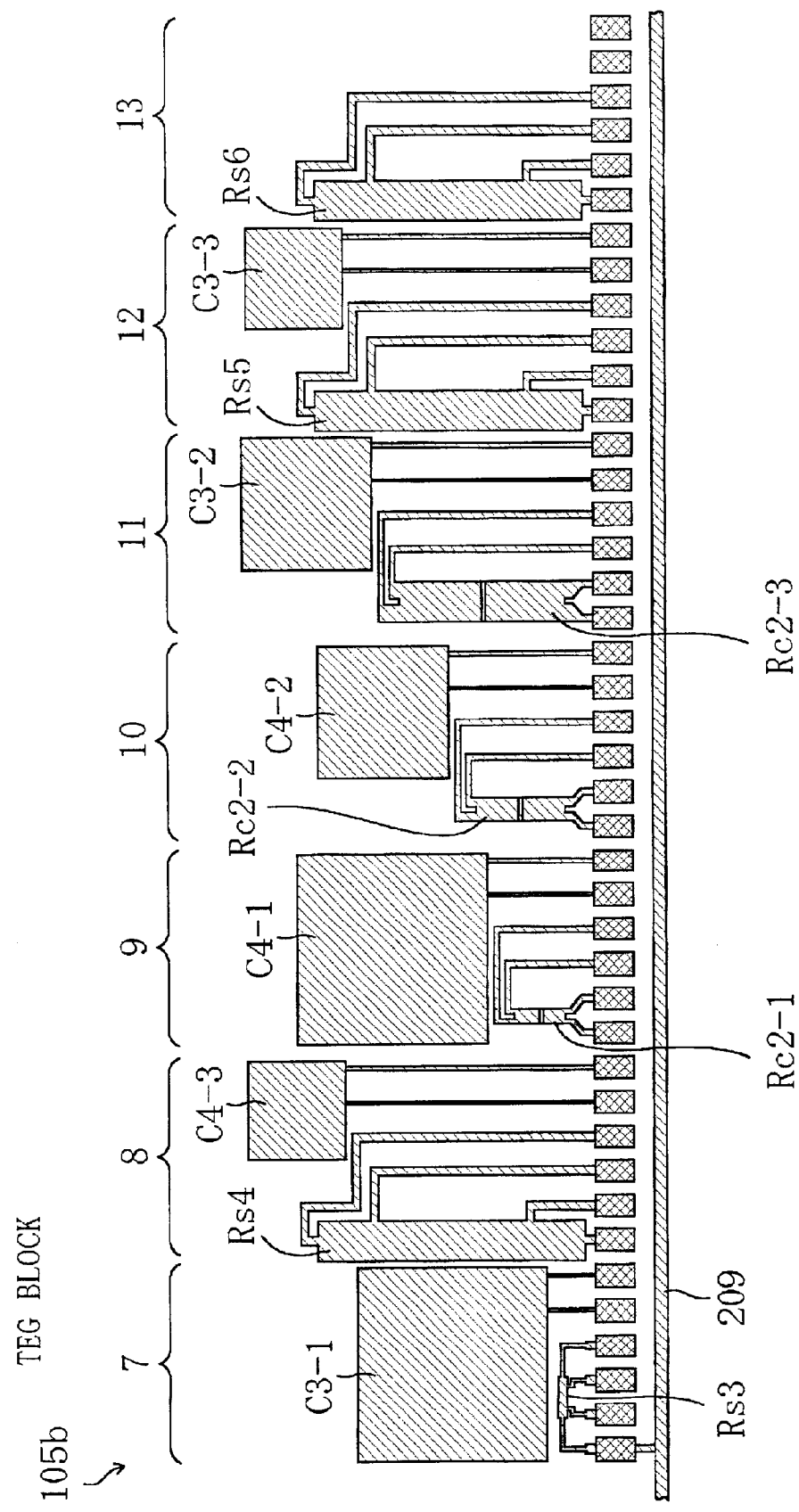
FIG. 4 is a plan view of a TEG 105b.

FIGS. 3 and 4 are plan views showing examples of the TEG. The TEGs 105a, 105b in FIGS. 3 and 4 are divided into thirteen TEG blocks in total, which are shown in Table 1 below. Note that, for convenience, the TEG is shown as separate TEGs 105*a*, 105*b* in FIGS. 3 and 4. However, the TEGs 105*a*, 105*b* in FIGS. 3 and 4 are formed together at one position on the insulating substrate 101 such that the TEG block 7 in FIG. 4 is located adjacent to the TEG block 6 in FIG. 3.

Table 1 also shows the name, purpose of measurement, characteristics to be tested, the number of measurement terminals, and relative area of the test elements included in each TEG block. In the column "Name of Test Element" in Table 1, the test elements denoted with the same character(s) and numeral before hyphen "-" and different numerals thereafter (such as C2-1, C2-2) represent test elements that are the same in terms of the characteristics to be tested, but different in the relative area of the element portion in the test element. In Table 1, "GI" indicates a gate insulation film, and "AO" indicates an anodic oxide film. Note that, in the figures and the following description, the term "gate metal sheet resistance" in the column "Characteristics to be tested" in Table 1 is sometimes simply referred to as "gate sheet resistance", and the terms "source ITO sheet resistance" and "source metal sheet resistance" are sometimes simply referred to as "source sheet resistance".

TABLE 1

| TEG block | Name of test element | Purpose of measurement | Characteristics to be tested | Number of measurement terminals | Relative area |
|---|---|---|---|---|---|
| 1 | TFT test element | To measure TFT characteristics | TFT characteristics | 3 | |
|   | C2-1 | To measure capacitance characteristics | gate insulation film capacitance | 2 | S2 |
| 2 | Rc1-1 | To measure contact resistance | drain-gate contact resistance | 4 | S1 |
|   | C1-1 | To measure capacitance characteristics | gate insulation film (with AO) capacitance | 2 | S2 |
| 3 | Rc1-2 | To measure contact resistance | drain-gate contact resistance | 4 | 2 × S1 |
|   | C2-2 | To measure capacitance characteristics | gate insulation film capacitance | 2 | ½ × S2 |
| 4 | Rc1-3 | To measure contact resistance | drain-gate contact resistance | 4 | ¼ × S1 |
|   | C1-2 | To measure capacitance characteristics | gate insulation film (with AO) capacitance | 2 | ½ × S2 |
| 5 | Rs1 | To measure wiring resistance | gate metal sheet resistance | 4 | |
|   | C1-3 | To measure capacitance characteristics | gate insulation film (with AO) capacitance | 2 | ¼ × S2 |
| 6 | Rs2 | To measure wiring resistance | source ITO sheet resistance | 4 | |
|   | C2-3 | To measure capacitance characteristics | gate insulation film capacitance | 2 | ¼ × S2 |
| 7 | Rs3 | To verify GI/AO dry etching | residual-gate-film sheet resistance | 4 | |
|   | C3-1 | To measure capacitance characteristics | passivation film capacitance | 2 | S2 |
| 8 | Rs4 | To measure wiring resistance | source metal sheet resistance | 4 | |
|   | C4-3 | To measure capacitance characteristics | total capacitance of organic insulation film and passivation film | 2 | ¼ × S2 |
| 9 | Rc2-1 | To measure contact resistance | picture element electrode-drain contact resistance | 4 | S1 |
|   | C4-1 | To measure capacitance characteristics | total capacitance of organic insulation film and passivation film | 2 | S2 |
| 10 | Rc2-2 | To measure contact resistance | picture element electrode-drain contact resistance | 4 | 2 × S1 |
|   | C4-2 | To measure | total capacitance of | 2 | ½ × S2 |

TABLE 1-continued

| TEG block | Name of test element | Purpose of measurement | Characteristics to be tested | Number of measurement terminals | Relative area |
|---|---|---|---|---|---|
| | | capacitance characteristics | organic insulation film and passivation film | | |
| 11 | Rc2-3 | To measure contact resistance | picture element electrode-drain contact resistance | 4 | 4 × S1 |
| | C3-2 | To measure capacitance characteristics | passivation film capacitance | 2 | ½ × S2 |
| 12 | Rs5 | To measure wiring resistance | picture-element electrode sheet resistance | 4 | |
| | C3-3 | To measure capacitance characteristics | passivation film capacitance | 2 | ¼ × S2 |
| 13 | Rs6 | To measure wiring resistance | $n^+$ film sheet resistance | 4 | |

In the TEGs 105a, 105b in FIGS. 3 and 4, each of the TEG blocks 1 to 12 includes a test element group including a resistance test element (or TFT test element) and a capacitance test element for evaluating different characteristics from each other. For example, the TEG block 1 includes a first test element group including a TFT test element and a capacitance test element (C2-1), and the TEG block 2 includes a second test element group including a resistance test element (Rc1-1) and a capacitance test element (C1-1). It should be noted that the TEG block 13 includes only a resistance test element (Rs6) as a test element.

In the present embodiment, each of the TEG blocks 1 to 12 includes two test elements for evaluating different characteristics from each other. However, each TEG block may include three or more test element for evaluating different characteristics from each other. Arrangement of the plurality of test elements in each TEG block is not specifically limited.

From the standpoint of effective use of the free region, it is desirable to combine a resistance test element and a capacitance test element so as to minimize the total area thereof. For example, in the case where Rs3 of the TEG block 7 having a small area (see FIG. 4) is provided as a resistance test element, it is desirable to combine Rs3 with a capacitance test element C3-1 of the TEG block 7 having a large area (see FIG. 4). It should be noted that, in the case where a TFT test element is provided instead of a resistance test element, it is impossible to combine the TFT test element with a test element for evaluating capacitance between a gate insulation film and an anodic oxide film (e.g., C1-1 in the TEG block 2). This is because a gate terminal of the TFT test element would be connected to one terminal of the test element for evaluating the capacitance between the gate insulation film and the anodic oxide film.

In the present embodiment, thirteen TEG blocks are formed on the free region of the insulating substrate 101. However, the number of TEG blocks may be reduced in order to omit one or more of the test elements. For example, the overall performance of the TFTs in the display portion 102 can be obtained by measuring the characteristics of the TFT test element. Therefore, measurement of specific characteristics such as $n^+$ film sheet resistance can be omitted. Of thirteen TEG blocks in Table 1, characteristics of the TEG blocks 3, 4, 10, 11 and 13, for example, can be roughly verified by measuring characteristics of the other TEG blocks. Therefore, measurement of these TEG blocks can be omitted. However, if there is a sufficient free region on the insulating substrate 101, it is more desirable to provide additional test elements for detailed testing.

The resistance test element (or TFT test element) and the capacitance test element included in each TEG block 1 to 12 are arranged adjacent to each other. Each TEG block 1 to 13 includes six test terminals, and each test element included in each TEG block 1 to 13 is connected to at least one of the six test terminals of that TEG block. Typically, the six test terminals included in each TEG block 1 to 13 is roughly divided into four test terminals connected to the resistance test element and two test terminals connected to the capacitance test element. Note that three of the four test terminals connected to the resistance test element can be connected to the TFT test element.

This will be described specifically for the TEG blocks 1 and 2. In the TEG block 1, the first test element group is connected to at least one of a plurality of first test terminals 106a to 106f. More specifically, the TFT test element included in the first test element group is connected to three test terminals 106a, 106b, 106c of the six first test terminals 106a to 106f, and the capacitance test element (C2-1) is connected to two test terminals 106e, 106f. The remaining one test terminal 106d is a dummy terminal that is not connected to any test element.

The dummy test element 106d is not involved in measurement of the characteristics of the test elements. However, in the case where contact portions of a probe (hereinafter, sometimes referred to as pins) directly contact the insulating substrate 101, defects such as film separation may possibly be generated by damage to the surface, depending on the type of a film formed on the insulating substrate 101. Providing the dummy test element 106d on the insulating substrate 101 can prevent generation of such defects.

If no dummy test terminal 106d is provided on the insulating substrate 101, the structure of the film formed on the insulating substrate 101 varies between the location where the test terminals 106a, 106b, 106c, 106e, 106f are provided and the location where no dummy test terminal 106d is provided, resulting in uneven height of the film formed on the insulating substrate 101. Accordingly, the contact portions of the probe are subjected to excessive loads when contacting the test terminals 106a, 106b, 106c, 106e, 106f, and therefore may possibly be damaged.

Providing the dummy test terminal 106d together with the test terminals 106a, 106b, 106c, 106e, 106f on the insulating substrate 101 allows for a uniform height on the insulating substrate 101. This enables the probe to contact the test terminals 106a to 106f with a uniform contact pressure, whereby damage to the contact portions of the probe can be prevented. Note that the TEG block 13 also has two dummy test terminals that are not connected to any test element.

In the TEG block 2, the second test element group is connected to a plurality of second test terminals 107a to 107f. More specifically, the resistance test element (Rc1-1) included in the second test element group is connected to four test terminals 107a, 107b, 107c, 107d of the six second test terminals 107a to 107f, and the capacitance test element (C1-1) is connected to the remaining two test terminals 107e, 107f.

It is also possible to measure the resistance test element with two terminals. However, measuring the resistance test element by the four-terminal method allows additional resistance such as contact resistance of the terminals to be removed, resulting in accurate measurement of bus line resistance and contact resistance.

As shown in FIG. 3, the plurality of first test terminals 106a to 106f in the TEG block 1 and the plurality of second test terminals 107a to 107f in the TEG block 2 are both arranged in line, and the plurality of first test terminals 106a to 106f in the TEG block 1 are arranged at the same pitch and with the same pattern as the plurality of second test terminals 107a to 107f in the TEG block 2. In the other TEG blocks 3 to 13 as well, six test terminals are arranged with the same pattern as that of the first test terminals 106a to 106f.

The test terminals included in each TEG block need only be arranged with the same pattern as that of the other TEG blocks, and the pitch and positions of the test terminals in a TEG block are not specifically limited. For example, in the TEG block 1, the pitch between adjacent test terminals 106a and 106b may be different from that between adjacent test terminals 106b and 106c. The test terminals 106a to 106f in the TEG block 1 may be arranged in a plurality of lines. Alternatively, the test terminals 106a to 106f in the TEG block 1 may be regularly arranged like in staggered arrangement, or may be irregularly arranged like in a scattered manner.

In the present embodiment, each TEG block includes six test terminals, so that measurement with a probe can be conducted on a six-terminal basis. This is advantageous in that poor contact resulting from displacement of the probe pins and the test terminals is less likely to occur as compared to the case where each TEG block includes several tens of test terminals. In other words, as the number of test terminals increases, it becomes more difficult to align the probe pins with the test terminals. Therefore, if the probe contacts the test terminals with slight displacement, one or more probe pins may not contact any test terminal, thereby possibly resulting in poor contact. In the present embodiment, each TEG block include a relatively small number of test terminals, so that measurement can be conducted by making the probe in contact with the test terminals on a TEG block-by-TEG block basis. This facilitates alignment of the probe pins and the test terminals, so that poor contact between the probe pins and the test terminals is less likely to occur even if the probe is slightly displaced from the test terminals.

Figure 5:
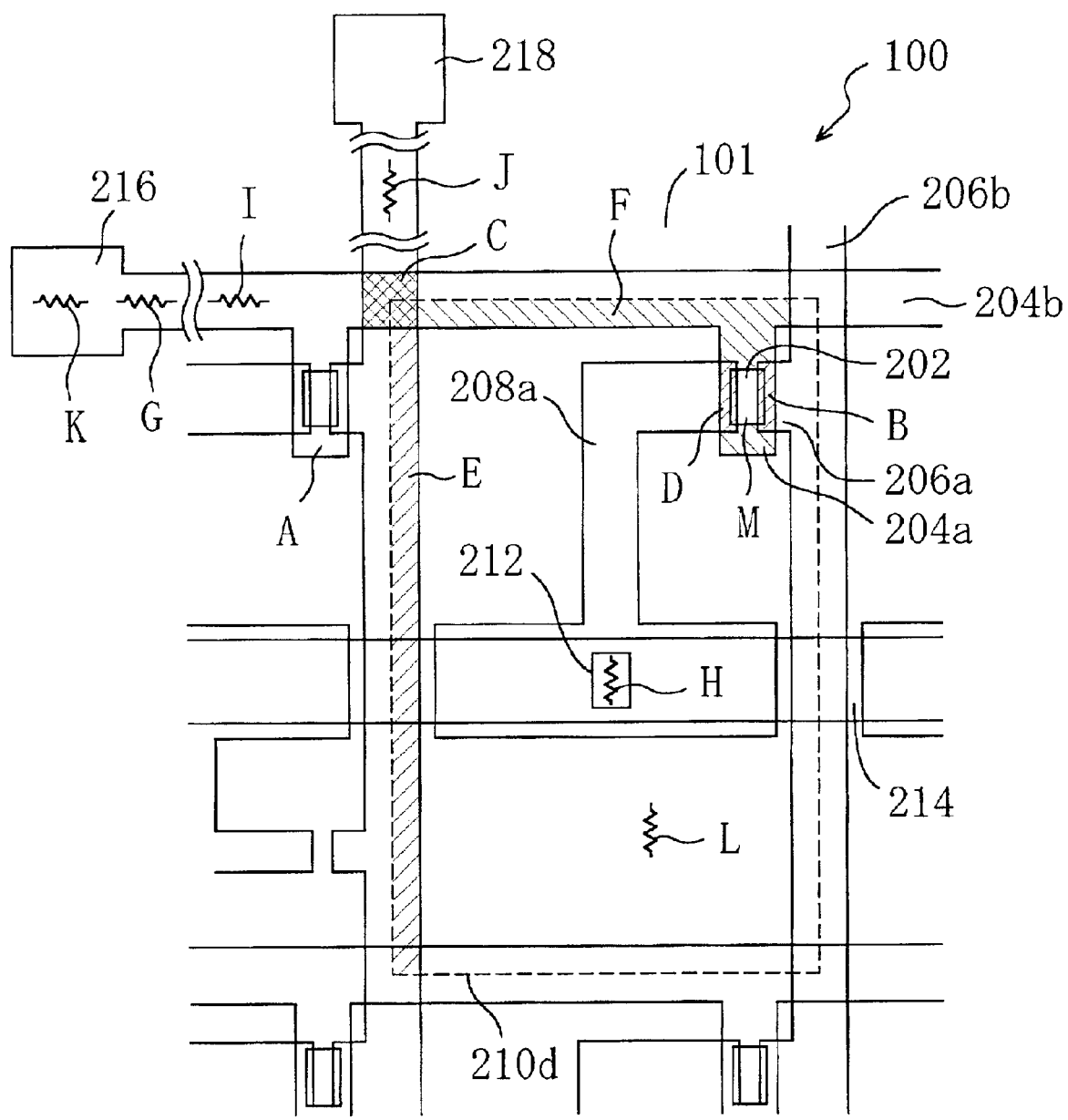
FIG. 5 is a plan view schematically showing a portion of a TFT 202 that corresponds to a single picture element.
Figure 6:
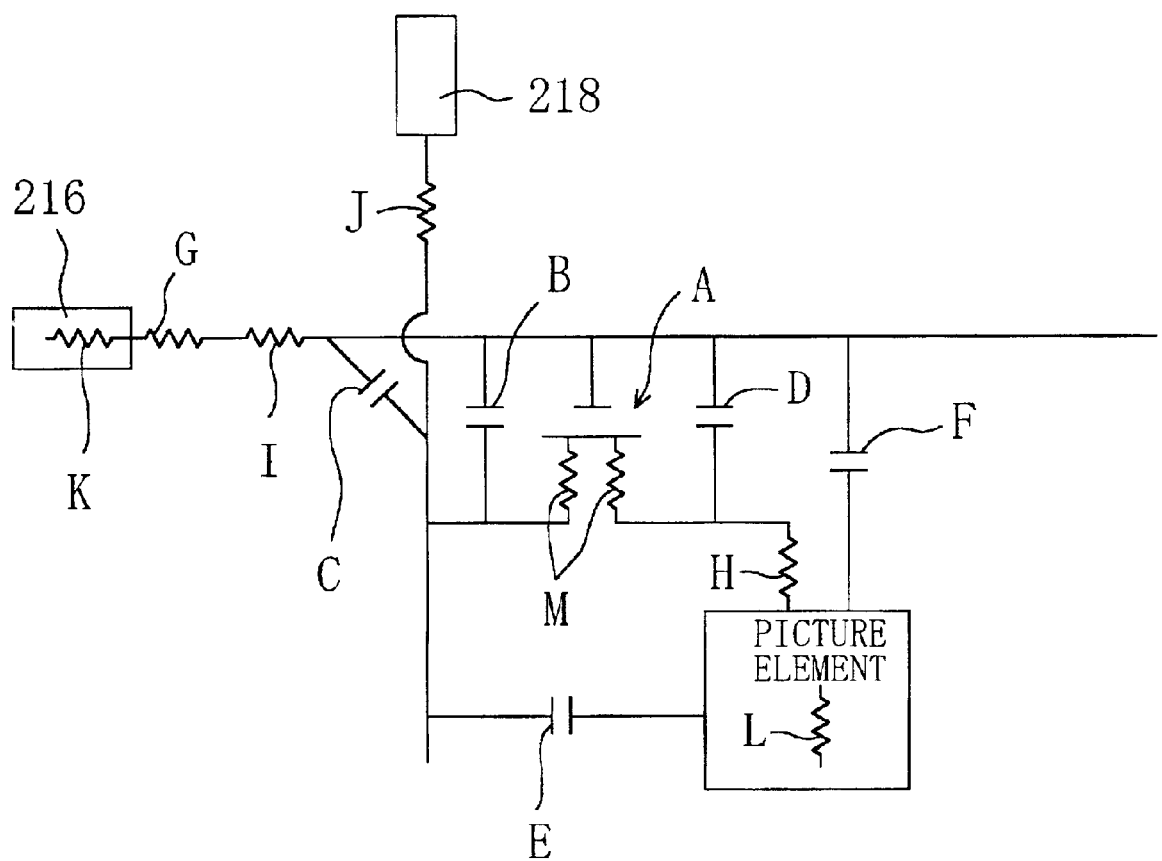
FIG. 6 is an equivalent circuit diagram of the TFT 202 in FIG. 5.

Hereinafter, the relation between the test elements included in the TEG blocks 1 to 13 in FIGS. 3 and 4 and the TFTs 202 in the display portion 102 will be described with reference to FIGS. 5 and 6. FIG. 5 is a plan view schematically showing a portion of the TFT 202 that corresponds to a single picture element. FIG. 6 is an equivalent circuit diagram of the TFT 202 in FIG. 5.

On the insulating substrate 101 are provided a plurality of scanning lines (gate bus lines) 204b and a plurality of signal lines (source bus lines) 206b. The scanning lines 204b extend in parallel with each other, and the signal lines 206b extend in parallel with each other so as to cross the scanning lines 204b. A plurality of TFTs 202 are respectively formed at the intersections of the scanning lines 204b and the signal lines 206b. More specifically, a gate electrode 204a electrically connected to the corresponding scanning line 204b and a gate insulation film of $SiN_x$, $SiO_2$, $Ta_2O_5$ or the like are sequentially formed on the insulating substrate 101. A semiconductor film of i-Si or the like is formed on the gate insulation film. Note that, in general, the scanning line and the gate electrode are integrally formed from a three-layer film of TaN (upper layer)/Ta (intermediate layer)/TaN (lower layer). On the semiconductor film are formed a source electrode 206a electrically connected to the corresponding signal line 206b and a drain electrode 208a of an ITO (indium tin oxide) film or the like. The TFT 202 is thus formed. Note that, in general, the signal line and the source electrode are integrally formed from an ITO film or the like. The TFT 202 in the display portion 102 can be fabricated by a known method such as sputtering and dry etching.

An organic insulation film of an acrylic resin or the like is formed on the TFT 202 so as to entirely cover the picture element. A picture-element electrode 210d of an ITO film or the like is formed on the organic insulation film. Note that the display device having the picture-element electrodes formed on the organic insulation film is disclosed in, e.g., Japanese Laid-Open Publication No. 9-152625.

The picture-element electrode 210d is electrically connected with the drain electrode 208a in a contact hole 212 formed in the organic insulation film. Near the contact hole 212, the drain electrode 208a has a rectangular shape extending in parallel with the scanning line 204b. A storage capacitor line 214 extending in parallel with the scanning line 204b is provided on the insulating substrate 101 with the gate insulation film interposed therebetween. More specifically, the storage capacitor line 214 is provided near the rectangular portion of the drain electrode 208a. The storage capacitor line 214 is typically formed from the same film as that of the scanning line 204b and the gate electrode 204a. The scanning line 204b and the signal line 206b are electrically connected to a gate external terminal 216 and a source external terminal 218, respectively. The scanning line 204b and the signal line 206b are connected to a scanning circuit and a hold circuit (both of which are not shown) through the gate external terminal 216 and the source external terminal 218, respectively.

The gate external terminal 216 is formed by, e.g., the following steps: a gate insulation film is formed on a gate sheet of the scanning line 204b, and a through hole is formed in the gate insulation film by dry etching or the like. A transparent electrode of an ITO film or the like is then formed on the gate insulation film, so that the gate sheet and the transparent electrode are connected to each other in the through hole. Note that the gate sheet is formed from a three-layer film of TaN (upper layer)/Ta (intermediate layer)/TaN (lower layer) and an anodic oxide film covering the three-layer film. When forming the through hole in the gate insulation film by dry etching or the like, the anodic oxide film and the TaN film (the upper layer of the gate sheet) are removed. At this time, the Ta film (the intermediate layer of the gate sheet) may possibly be removed. If this Ta film is entirely removed, poor contact with the transparent electrode may result. In the present embodiment, a resistance test element (Rs3 in Table 1) for residual-gate-film sheet resistance is provided in order to measure the resistance of the residual Ta film (i.e., the residual intermediate layer of the gate sheet) resulting from formation of the through hole.

Table 2 below shows the correspondence between characteristics at A to M of the equivalent circuit of FIG. 6 and the test elements in Table 1.

TABLE 2

| | Characteristics to be tested | Name of Test element |
|---|---|---|
| A | TFT characteristics | TFT test element |
| B, C | gate insulation film (with AO) capacitance (gate-source capacitance) | C1 (C2) |
| D | gate insulation film (with AO) capacitance (gate-drain capacitance) | C1 (C2) |
| E | total capacitance of passivation film and organic insulation film (source-drain capacitance) | C4 (C3) |
| F | total capacitance of gate insulation film (with AO), passivation film and organic insulation film | C1, C2, C3, C4 |
| G | drain/gate contact resistance | Rc1 |
| H | picture element electrode-drain contact resistance | Rc2 |
| I | gate sheet resistance | Rs1 |
| J | source sheet resistance | Rs2, Rs4 |
| K | residual-gate-film sheet resistance | Rs3 |
| L | picture-element electrode sheet resistance | Rs5 |
| M | $n^+$ film sheet resistance | Rs6 |

The TFT 202 in the display portion 102 of the present embodiment is generally formed by the steps of: forming a gate electrode (step 1); forming a gate insulation film and forming and patterning a semiconductor film (step 2); patterning the gate insulation film (step 3); forming and patterning a source electrode and a drain electrode (step 4); forming and patterning a passivation film of $SiN_x$, $SiO_2$, $Ta_2O_5$ or the like (step 5); forming and patterning an organic insulation film (step 6); and forming and patterning a picture-element electrode (step 7). Each test element and each test terminal in Table 1 are formed together with the TFT 202 in the display portion 102 by the manufacturing process of the TFT 202 of the display portion 102. This can suppress increase in costs for evaluating characteristics of the circuit elements.

Figure 7:
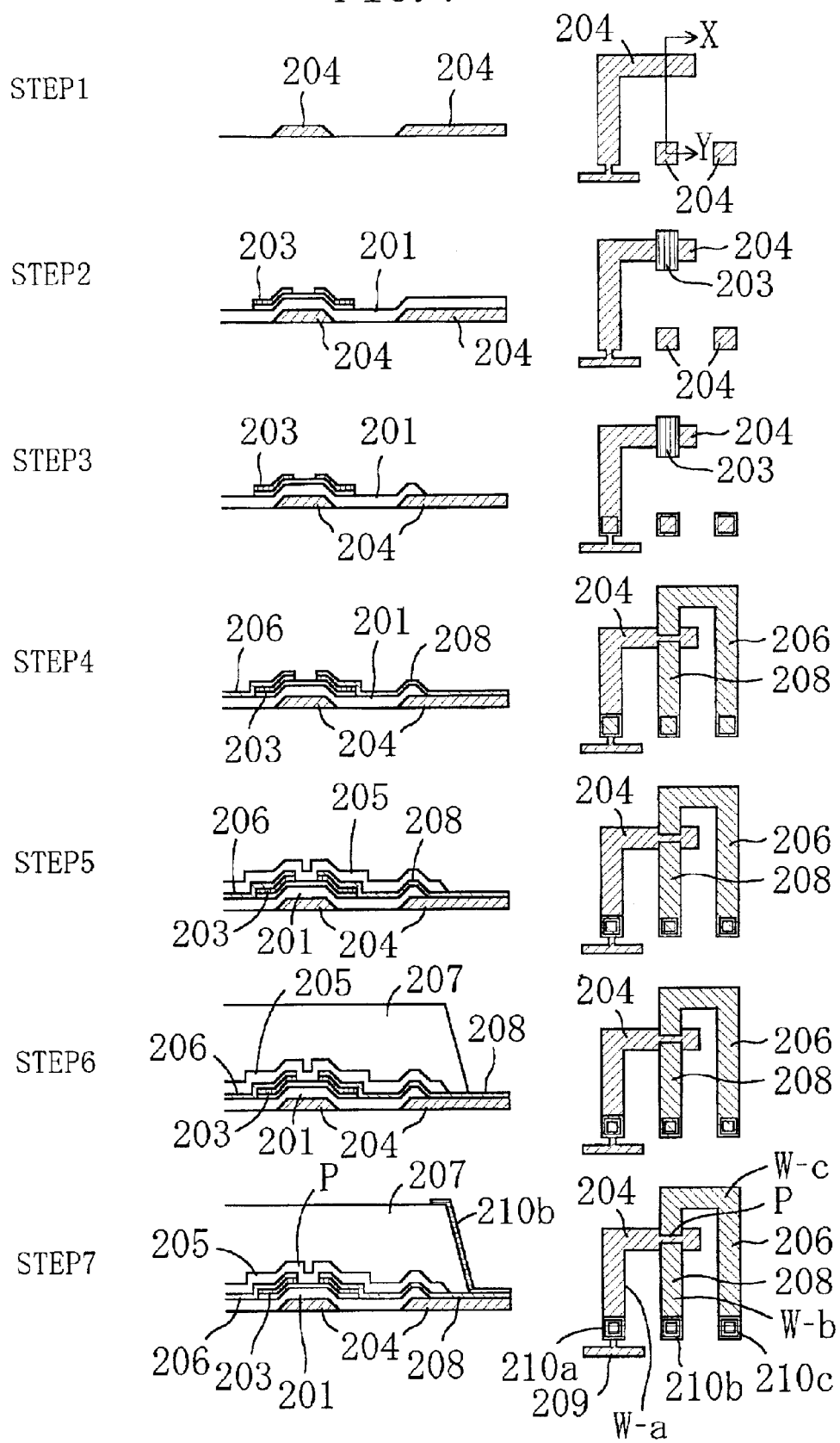
FIG. 7 is a diagram illustrating a manufacturing process of a TFT test element in Table 1, showing plan views on the right, and cross-sectional views taken along the line X-Y in the respective plan views on the left.

A method for forming a test element will now be exemplarily described for the TFT test element in Table 1 in connection with FIG. 7. Note that, in the following description, the elements denoted with the same reference numerals as those of the films of the TFT 202 in the display portion 102 are formed from the same film as that denoted with that reference numeral.

FIG. 7 is a diagram illustrating a manufacturing process of the TFT test element in Table 1, showing plan views on the right, and cross-sectional views taken along the line X-Y in the respective plan views on the left. In FIG. 7, the aforementioned step numbers of the TFT 202 (i.e., steps 1 to 7) are used for comparison with the time series of the steps for forming the TFT 202 of the display device circuit 104.

A gate sheet 204 of the TFT test element is formed from the same film as that of the gate electrode 204a of the TFT 202 in the display portion 102 (step 1). A gate insulation film 201 and a semiconductor film 203 are formed on the gate sheet 204, and the semiconductor film 203 is patterned (step 2). After patterning the gate insulation film 201 (step 3), a source sheet 206 and a drain sheet 208 are formed and patterned (step 4). A passivation film 205 is formed so as to almost entirely cover the patterned gate sheet 204, source sheet 206 and drain sheet 208, and then is patterned (step 5). Thereafter, an organic insulation film 207 is formed (step 6). Simultaneously with formation of the picture-element electrode 210d of the display portion 102, electrodes 210a, 210b, 210c of the test terminals 106a, 106b, 106c are respectively connected to the gate sheet 204, the drain sheet 208 and the source sheet 206 (step 7).

The TFT test element in FIG. 7 includes an element portion P to be measured (a portion near the semiconductor film 203), and wiring portions W-a, W-b, W-c respectively connecting the element portion P with the electrodes 210a, 210b, 210c of the test terminals 106a, 106b, 106c.

Note that, in order to anodize the gate sheet 204, the electrode 210a connected thereto is connected to a short-circuit line 209 that is formed from the same film as that of the gate electrode 204a of the TFT 202 in the display portion 102. However, the electrodes 210c, 210b respectively connected to the source sheet 206 and the drain sheet 208 are not connected to the short-circuit line 209 in order to prevent short-circuiting with the gate sheet 204.

Figure 8A:
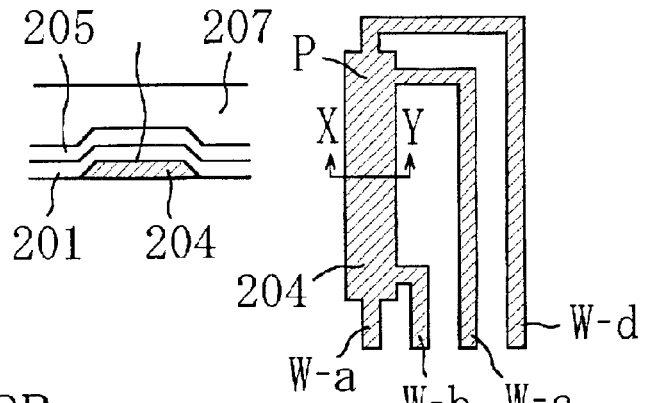
FIGS. 8A to 8C show plan views (on the right) of resistance test elements in Table 1, and cross-sectional views (on the left) taken along the line X-Y in the respective plan views.
Figure 8B:
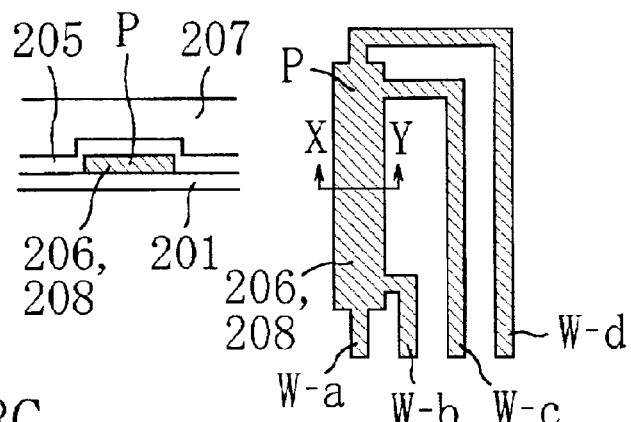
Figure 8C:
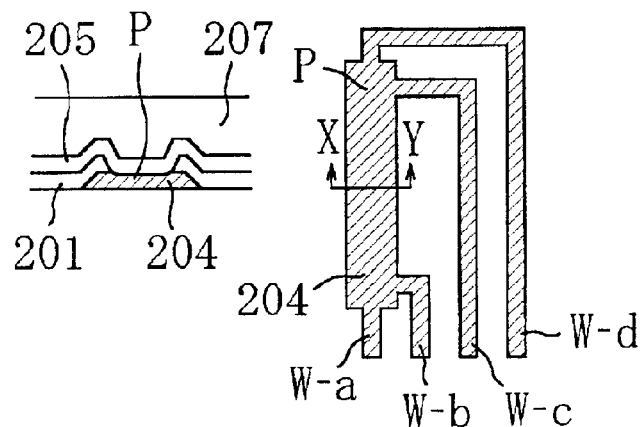
Figure 9A:
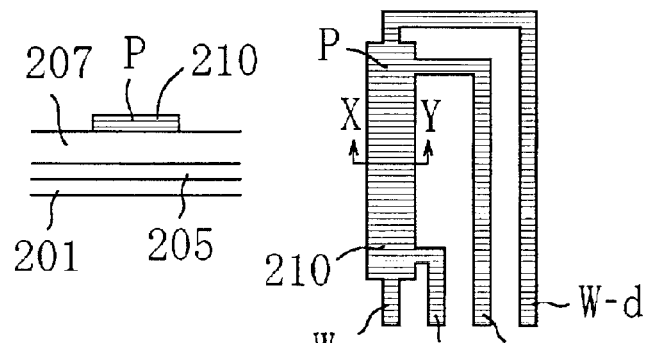
FIGS. 9A to 9D show plan views (on the right) of resistance test elements in Table 1, and cross-sectional views (on the left) taken along the line X-Y in the respective plan views.
Figure 9B:
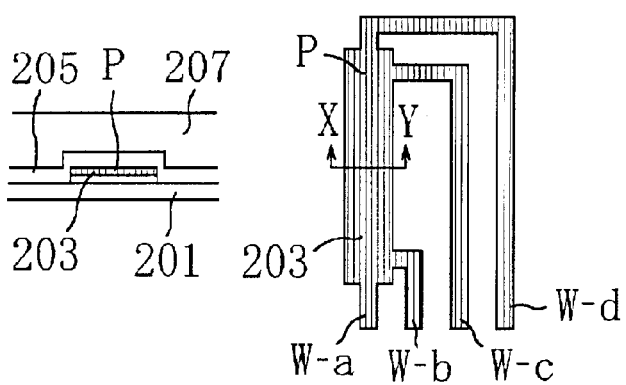
Figure 9C:
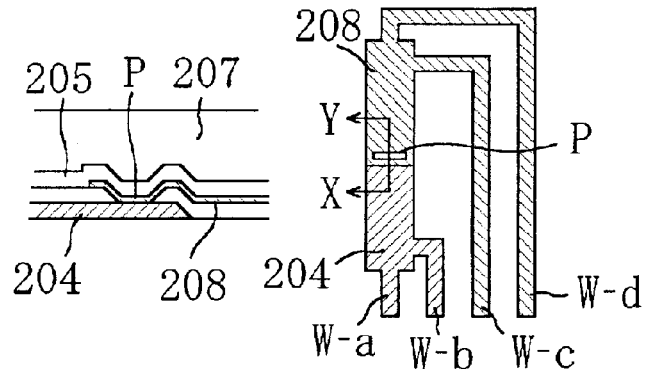
Figure 9D:
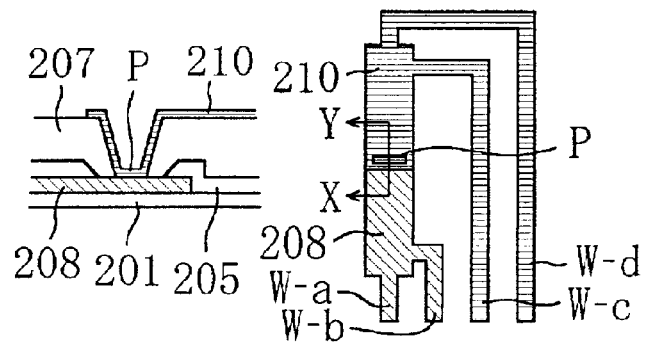

FIGS. 8A to 8C and FIGS. 9A to 9D show plan views (on the right) of the resistance test elements in Table 1, and cross-sectional views (on the left) taken along the line X-Y in the respective plan views. FIG. 8A shows a test element for gate sheet resistance (Rs1 in Table 1), FIG. 8B shows a test element for source (drain) sheet resistance (Rs2, Rs4 in Table 1), and FIG. 8C shows a test element for residual-gate-film sheet resistance (Rs3 in Table 1). FIG. 9A shows a test element for picture-element electrode sheet resistance (Rs5 in Table 1), FIG. 9B shows a test element for $n^+$ film sheet resistance (Rs6 in Table 1), FIG. 9C shows a test element for drain-gate contact resistance (Rc1 in Table 1), and FIG. 9D shows a test element for picture element electrode-drain contact resistance (Rc2 in Table 1). Note that the test terminals connected to each resistance test elements are not shown in FIGS. 8A to 8C and FIGS. 9A to 9D.

Each of the resistance test elements shown in FIGS. 8A to 8C and FIGS. 9A to 9D includes an element portion P to be measured, and wiring portions W-a, W-b, W-c, W-d respectively connecting the element portion P to four test terminals. The element portion P in each of the sheet resistance test elements (Rs1 to Rs6) in FIGS. 8A, 8B, 8C, 9A and 9B is a portion located between two wiring portions W-b and W-c in the rectangular portion connected to the four wiring portions W-a, W-b, W-c, W-d. The element portion P in each of the contact resistance test elements (Rc1, Rc2) in FIGS. 9C, 9D is a portion where the drain sheet 208 and the gate sheet 204 contact each other, or a portion where the picture-element electrode sheet 210 and the drain sheet 208 contact each other.

As in the case of the TFT test element, each of the resistance test elements in FIGS. 8A to 8C and FIGS. 9A to 9D is formed by the steps for forming the TFT 202 of the display portion 102. For example, the test element for gate sheet resistance (Rs1 in Table 1) is formed from the same film as that of the gate electrode 204a of the TFT 202 in the display portion 102, and is formed together with the gate electrode 204a of the TFT 202. The test element for drain-gate contact resistance (Rc1 in Table 1) is fabricated as follows: after forming the gate insulation film 201 covering the gate sheet 204, a through hole for contact with the gate sheet 204 is formed in the gate insulation film 201, and then the drain sheet 208 is formed on the gate insulation film 201.

The gate sheet 204 and the drain sheet 208 are each connected to four test terminals. Two of the four test terminals are used as terminals for applying a current, and the remaining two test terminals are used as terminals for measuring a voltage. The test element for picture element electrode-drain contact resistance (Rc2 in Table 1) is fabricated as follows: after a through hole is formed in the organic insulation film 207 and the passivation film 205, the picture-element electrode sheet 210 is formed on the organic insulation film 207 so that the picture-element electrode sheet 210 contacts the drain sheet 208 in the through hole. The drain sheet 208 and the picture-element electrode sheet 210 are respectively connected to two test terminals used as current-applying terminals and two test terminals used as voltage-measuring terminals.

FIGS. 10A to 10E show plan views (on the right) of the capacitance test elements, and cross-sectional views (on the left) taken along the line X-Y in the respective plan views. FIG. 10A shows a test element for gate insulation film capacitance (with an anodic oxide film; C1 in Table 1), FIG. 10B shows a test element for gate insulation film capacitance (C2 in Table 1), FIG. 10C shows a test element for passivation film capacitance (C3 in Table 1), FIG. 10D shows a test element for the total capacitance of the passivation film and the organic insulation film (C4 in Table 1), and FIG. 10E shows a test element for organic insulation film capacitance. Note that the test terminals connected to each of the capacitance test elements are not shown in FIGS. 10A to 10E.

The test element for organic insulation film capacitance in FIG. 10E is omitted in the present embodiment (see Table 1). This is because the organic insulation film capacitance can be calculated from the measurement results of the test element for passivation film capacitance in FIG. 10C (C3 in Table 1) and the test element for the total capacitance of the passivation film and the organic insulation film in FIG. 10D (C4 in Table 1). It should be understood that formation of the test element for organic insulation film capacitance on the insulating substrate 101 is not eliminated in the present invention. The test element for organic insulation film capacitance may be provided instead of the test element for passivation film capacitance (C3 in Table 1) or the test element for the total capacitance of the passivation film and the organic insulation film (C4 in Table 1). Alternatively, the test element for organic insulation film capacitance may be provided together with the test element for passivation film capacitance (C3 in Table 1) and the test element for the total capacitance of the passivation film and the organic insulation film (C4 in Table 1).

Each of the capacitance test elements in FIGS. 10A to 10E includes an element portion P to be measured, and wiring portions W-e, W-f respectively connecting the element portion P to two test terminals. The element portion P in each of the capacitance test elements is a portion interposed between two sheets respectively connected to the two test terminals.

As in the case of the TFT test element, each of the capacitance test elements in FIGS. 10A to 10E is formed by the steps for forming the TFT 202 of the display portion 102. For example, in the case of the test element for gate insulation film capacitance (C1, C2 in Table 1), the gate sheet 204 is formed and patterned, and the gate insulation film 201 of a silicon nitride film or the like is formed. The source sheet 206 (or drain sheet 208) is formed on the gate sheet 204 and the gate insulation film 201. The source sheet 206 (or drain sheet 208) thus formed is patterned, so that the gate insulation film 201 is interposed between the gate sheet 204 and the source sheet 206 (or drain sheet 208). Test elements for gate insulation film capacitance are thus formed with a fixed area. In the case of the test element for gate insulation film capacitance having an anodic oxide film 211 interposed between the gate sheet 204 and the gate insulation film 201 (C1 in Table 1), the gate sheet 204 is connected to the short-circuit line 209 so as to be anodized.

In the case of the test element for passivation film capacitance (C3 in Table 1), the test element for the total capacitance of the passivation film and the organic insulation film (C4 in Table 1) and the test element for organic insulation film capacitance, the source sheet 206 (or drain sheet 208) is formed and patterned, and then the insulation film other than the passivation film 205 and/or organic insulation film 207 required for capacitance measurement is removed by patterning. The picture-element electrode sheet 210 is formed on the passivation film 205 or the organic insulation film 207. The picture-element electrode sheet 210 thus formed is patterned so that the passivation film 205 and/or the organic insulation film 207 are interposed between the source sheet 206 (or drain sheet 208) and the picture-element electrode sheet 210. Test elements for capacitance of various insulation films are thus formed with a fixed area. The gate sheet 204, the source sheet 206 (or drain sheet 208) and the picture-element electrode sheet 210 are each connected to a single test terminal.

Hereinafter, the test terminals connected to the test elements will be described. The test terminals of the present embodiment include a test terminal connected to the gate sheet 204, a test terminal connected to the source sheet 206 (or drain sheet 208), a test terminal connected to the picture-element electrode sheet 210, and a test terminal connected to the n$^+$ film sheet. First, the test terminal connected to the gate sheet 204 will be described.

The test elements including the gate sheet 204 include a TFT test element, a test element for gate sheet resistance (Rs1 in Table 1), a test element for gate insulation film capacitance (C1, C2 in Table 1), a test element for drain-gate contact resistance (Rc1 in Table 1), and the like. A method for forming a test terminal connected to a test element including the gate sheet 204 is the same as a method for forming the gate external terminal 216 of the scanning line (gate bus line) 204b. More specifically, after patterning the gate sheet 204, the gate insulation film 201 and the organic insulation film 207 are formed. A through hole is formed in the gate insulation film 201 and the organic insulation film 207 at a location to be in contact with the contact portions of the probe, so that the gate sheet 204 is partially exposed. An electrode of, e.g., ITO connecting to the exposed gate sheet 204 is formed on the organic insulation film 207. The test terminal 106a connected to the gate sheet 204 will now be described specifically in connection with the TFT test element in FIG. 7. Note that, in FIGS. 11 to 14, the aforementioned step numbers of the TFT 202 (i.e., steps 1 to 7) are used for comparison with the time series of the steps for forming the TFT 202 of the display portion 102.

Figure 11:
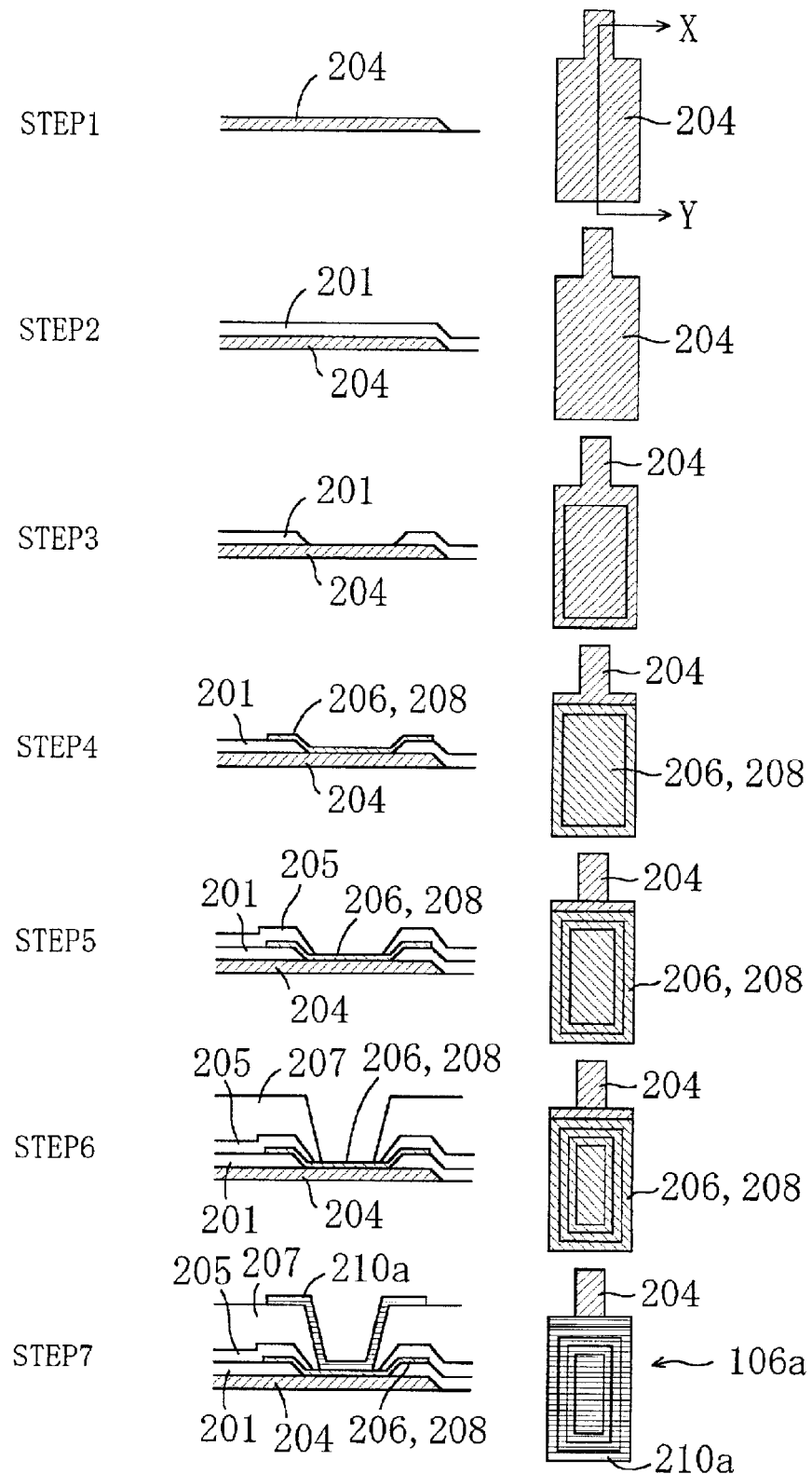
FIG. 11 is a diagram illustrating a manufacturing process of a test terminal 106a connected to a gate sheet 204 of the TFT test element in FIG. 7, showing plan views on the right and cross-sectional views taken along the line X-Y in the respective plan views on the left.

FIG. 11 is a diagram illustrating a manufacturing process of the test terminal 106a connected to the gate sheet 204 of the TFT test element in FIG. 7, showing plan views on the right and cross-sectional views taken along the line X-Y in the respective plan views on the left.

First, the gate sheet 204 in the element portion of the TFT test element is formed by patterning, as well as the gate sheet 204 extended from the element portion of the TFT test element is formed by patterning (step 1). The gate insulation film 201 is formed on the gate sheet 204 (step 2), and then patterned so as to form a through hole therein (step 3). The source sheet 206 (or drain sheet 208) is formed and patterned so as to be separated from the TFT test element (step 4). Thereafter, the passivation film 205 is formed and patterned so as to partially expose the source sheet 206 (or drain sheet 208) (step 5). The organic insulation film 207 is then formed and patterned (step 6), and the electrode 210a is formed on the organic insulation film 207 so as to be connected to the exposed portion of the source sheet 206 (or drain sheet 208) (step 7).

Figure 12:
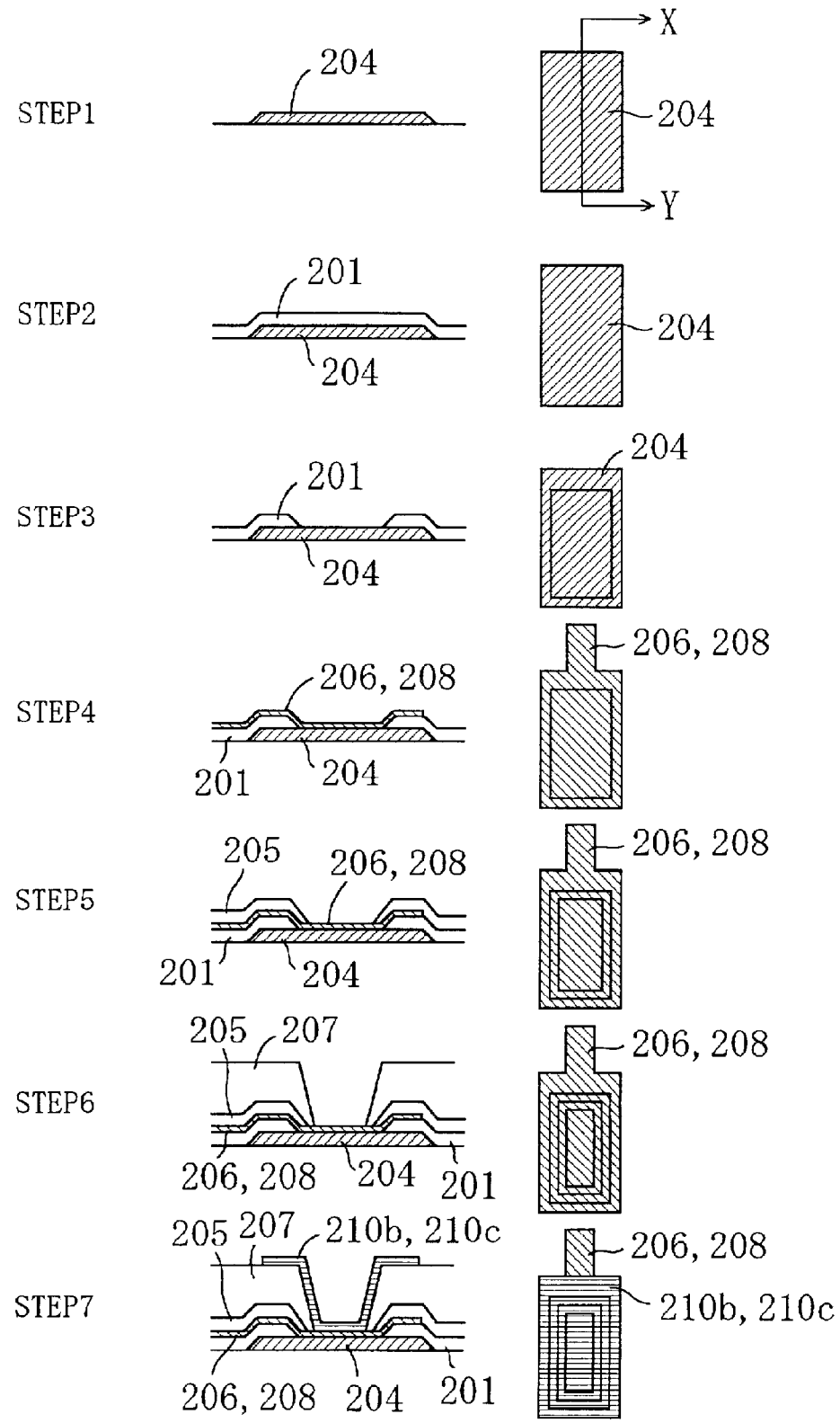
FIG. 12 is a diagram illustrating a manufacturing process of a test terminal 106b (or 106c) connected to a source sheet 206 (or drain sheet 208) of the TFT test element in FIG. 7, showing plan views on the right and cross-sectional views taken along the line X-Y in the respective plan views on the left.

Hereinafter, the test terminal 106b (or 106c) connected to the source sheet 206 (or drain sheet 208) will be exemplarily described in connection with the TFT test element in FIG. 7. FIG. 12 is a diagram illustrating a manufacturing process of the test terminal 106b (or 106c) connected to the source sheet 206 (or drain sheet 208) of the TFT test element in FIG. 7, showing plan views on the right and cross-sectional views taken along the line X-Y in the respective plan views on the left.

First, the gate sheet 204 is formed and patterned so as to be separated from the TFT test element and the short-circuit line 209 (step 1). Thereafter, the gate insulation film 201 is formed on the gate sheet 204 (step 2), and then patterned so as to form a through hole therein (step 3). The source sheet 206 (or drain sheet 208) is formed and patterned so as to be extended from the element portion of the TFT test element (step 4). Thereafter, the passivation film 205 is formed and patterned so as to partially expose the source sheet 206 (or drain sheet 208) (step 5). The organic insulation film 207 is then formed and patterned (step 6), and the electrode 210b (or 210c) is formed on the organic insulation film 207 so as to be connected to the exposed portion of the source sheet 206 (or drain sheet 208) (step 7).

Hereinafter, a method for manufacturing a test terminal connected to the picture-element electrode sheet 210 will be described. Note that the test elements including the picture-element electrode sheet 210 include the resistance test elements Rc2 and Rc5 in Table 1.

Figure 13:
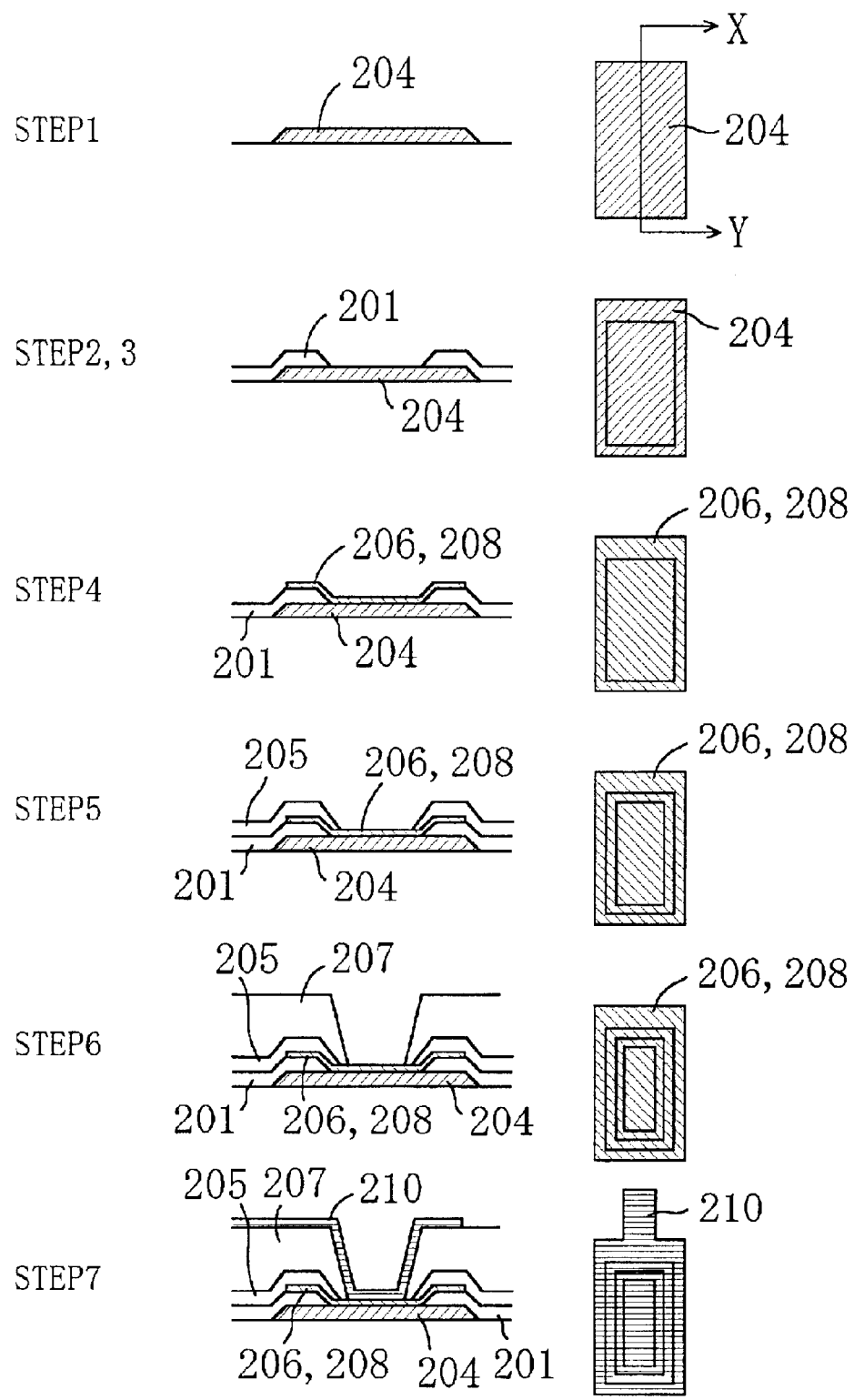
FIG. 13 is a diagram illustrating a manufacturing process of a test terminal connected to a picture-element electrode sheet 210, showing plan view on the right and cross-sectional views taken along the line X-Y in the respective plan views on the left.

FIG. 13 is a diagram illustrating a manufacturing process of the test terminal connected to the picture-element electrode sheet 210, showing plan view on the right and cross-sectional views taken along the line X-Y in the respective plan views on the left.

First, the gate sheet 204 is formed and patterned so as to be separated from the short-circuit line 209 (step 1). Thereafter, the gate insulation film 201 is formed on the gate sheet 204 and patterned so as to form a through hole therein (steps 2, 3). The source sheet 206 (or drain sheet 208) is formed and patterned so as to be separated from the test element (step 4). Thereafter, the passivation film 205 is formed and patterned so as to partially expose the source sheet 206 (or drain sheet 208) (step 5). The organic insulation film 207 is then formed and patterned (step 6). The electrode 210 extended from the element portion of the picture-element electrode sheet 210 of the test element is formed on the organic insulation film 207, so that the electrode 210 is connected to the exposed portion of the source sheet 206 (or drain sheet 208) (step 7).

Hereinafter, a method for manufacturing a test terminal connected to the n$^+$ film sheet will be described. Note that the test elements including the n$^+$ film sheet include Rs6 in Table 1.

Figure 14:
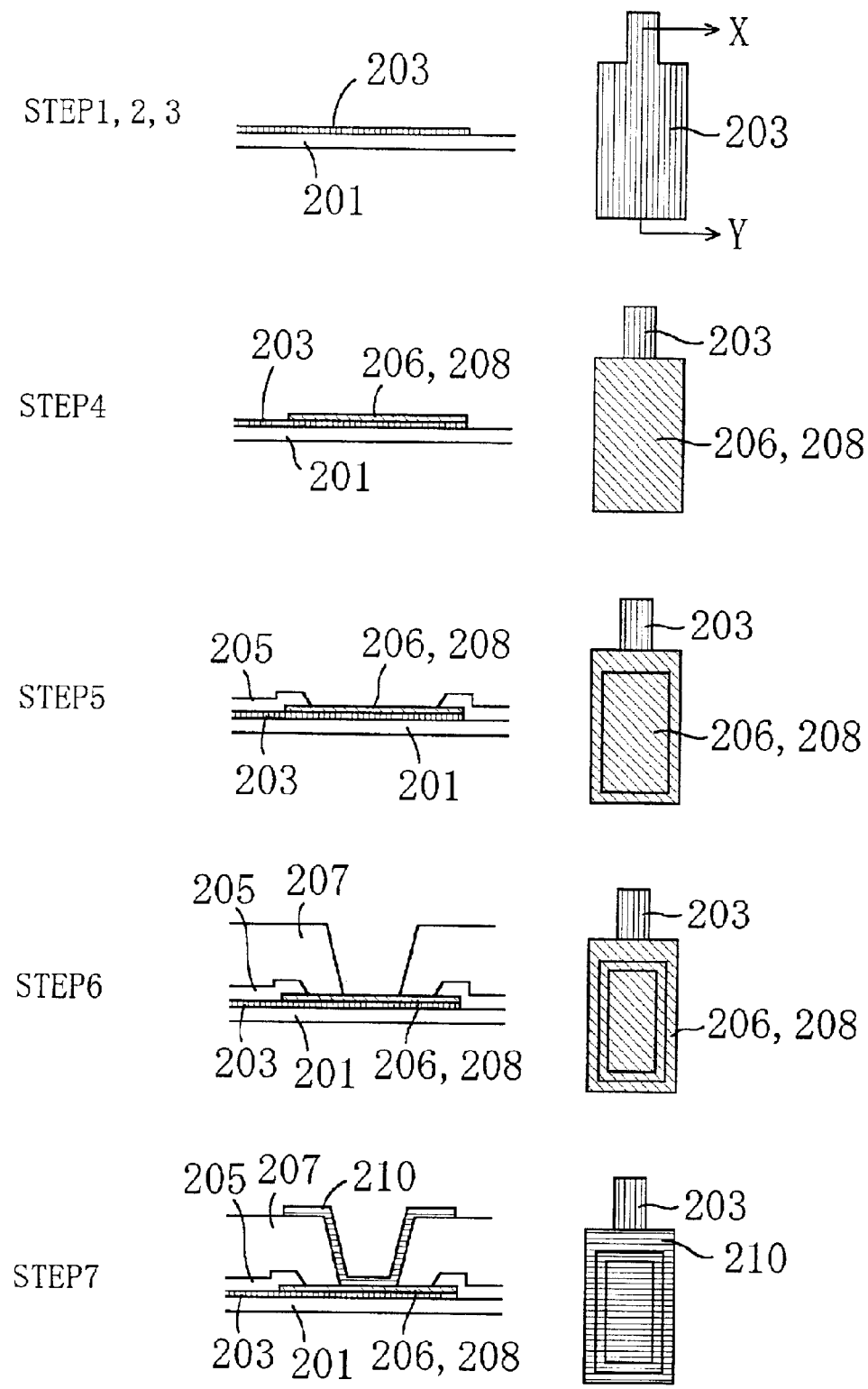
FIG. 14 is a diagram illustrating a manufacturing process of a test terminal connected to an $n^+$ film sheet, showing plan views on the right, and cross-sectional views taken along the line X-Y in the respective plan views on the left.

FIG. 14 is a diagram illustrating a manufacturing process of the test terminal connected to the n$^+$ film sheet, showing plan views on the right, and cross-sectional views taken along the line X-Y in the respective plan views on the left.

First, the gate insulation film 201 is formed, and the semiconductor film 203 is formed and patterned so as to be extended from the element portion of the n$^+$ film sheet (semiconductor film 203) of the test element (steps 1, 2, 3). The source sheet 206 (or drain sheet 208) is formed on the semiconductor film 203, and then patterned (step 4). Thereafter, the passivation film 205 is formed and patterned so as to partially expose the source sheet 206 (or drain sheet 208) (step 5). The organic insulation film 207 is then formed and patterned (step S6), and the electrode 210 is formed on the organic insulation film 207 so as to be connected to the exposed portion of the source sheet 206 (or drain sheet 208) (step 7).

(Second Embodiment)

In the present embodiment, a display device substrate of a type different from the display device substrate 100 of the first embodiment will be described. More specifically, a display device substrate having no organic insulation film formed on the TFT will be described. In the present embodiment, TEG blocks 21 to 24 shown in Table 3 below are provided on the insulating substrate 101. Note that additional TEG blocks may be provided as shown in Table 4 below.

TABLE 3

| TEG block | Name of test element | Purpose of measurement | Characteristics to be tested | Number of measurement terminal | Relative area |
|---|---|---|---|---|---|
| 21 | TFT test element | To measure TFT characteristics | TFT characteristics | 3 | |
| | C2-1 | To measure capacitance characteristics | gate insulation film capacitance | 2 | S2 |
| 22 | Rc1-1 | To measure contact resistance | drain-gate contact resistance | 4 | S1 |
| | C1-1 | To measure capacitance characteristics | gate insulation film (with AO) capacitance | 2 | S2 |

TABLE 3-continued

| TEG block | Name of test element | Purpose of measurement | Characteristics to be tested | Number of measurement terminal | Relative area |
|---|---|---|---|---|---|
| 23 | Rs1 | To measure wiring resistance | gate metal sheet resistance | 4 | |
| | C1-3 | To measure capacitance characteristics | gate insulation film (with AO) capacitance | 2 | ¼ × S2 |
| 24 | Rs2 | To measure wiring resistance | source ITO sheet resistance | 4 | |
| | C2-3 | To measure capacitance characteristics | gate insulation film capacitance | 2 | ¼ × S2 |

TABLE 4

| TEG block | Name of test element | Purpose of measurement | Characteristics to be tested | Number of measurement terminal | Relative area |
|---|---|---|---|---|---|
| 1 | TFT test element | To measure TFT characteristics | TFT characteristics | 3 | |
| | C2-1 | To measure capacitance characteristics | gate insulation film capacitance | 2 | S2 |
| 2 | Rc1-1 | To measure contact resistance | drain-gate contact resistance | 4 | S1 |
| | C1-1 | To measure capacitance characteristics | gate insulation film (with AO) capacitance | 2 | S2 |
| 3 | Rc1-2 | To measure contact resistance | drain-gate contact resistance | 4 | 2 × S1 |
| | C2-2 | To measure capacitance characteristics | gate insulation film capacitance | 2 | ½ × S2 |
| 4 | Rc1-3 | To measure contact resistance | drain-gate contact resistance | 4 | ¼ × S1 |
| | C1-2 | To measure capacitance characteristics | gate insulation film (with AO) capacitance | 2 | ½ × S2 |
| 5 | Rs1 | To measure wiring resistance | gate metal sheet resistance | 4 | |
| | C1-3 | To measure capacitance characteristics | gate insulation film (with AO) capacitance | 2 | ¼ × S2 |
| 6 | Rs2 | To measure wiring resistance | source ITO sheet resistance | 4 | |
| | C2-3 | To measure capacitance characteristics | gate insulation film capacitance | 2 | ¼ × S2 |
| 7 | Rs3 | To verify GI/AO dry etching | residual-gate-film sheet resistance | 4 | |
| 8 | Rs4 | To measure wiring resistance | source metal sheet resistance | 4 | |
| 9 | Rs6 | To measure wiring resistance | $n^+$ film sheet resistance | 4 | |

Figure 15:
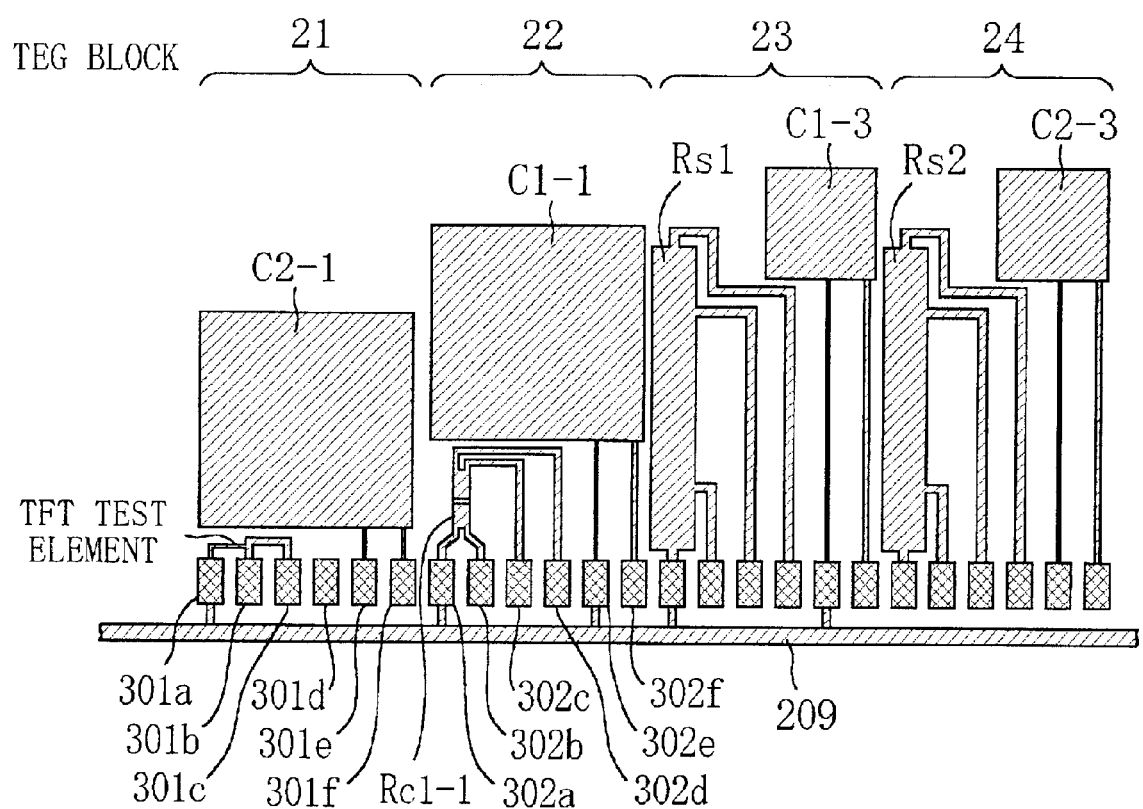
FIG. 15 is a plan view of TEG blocks 21 to 24 in Table 3 that are formed on an insulating substrate 100.

FIG. 15 is a plan view of the TEG blocks 21 to 24 in Table 3 that are formed on the insulating substrate 101. The resistance test element (or TFT test element) and the capacitance test element included in each of the TEG blocks 21 to 24 are arranged adjacent to each other. Of the test elements shown in FIG. 15, the capacitance test elements C1-1, C1-3, C2-1, C2-3 have the same structure as that of the test elements Cl-1, C1-3, C2-1, C2-3 in Table 1, respectively. Moreover, the resistance test elements Rc1-1, Rs1, Rs2 and the TFT test element have the same structure as that of the resistance test elements Rc1-, Rs1, Rs2 and the TFT test element in Table 1 except that the resistance test elements and the TFT test element in FIG. 15 have no organic insulation film 207. In other words, the structure of the resistance test elements Rc1-1, Rs1, Rs2 corresponds to the structure of FIGS. 9C, 8A, 8B having the organic insulation film 207 eliminated therefrom, respectively. The TFT test element has the structure shown in step 5 of FIG. 7. Cross-sectional views of the test elements in FIG. 15 are herein omitted. Detailed description of the element portion and wiring portions of each test element, and a manufacturing method of each test element is also omitted. Note that, of the resistance test elements and the capacitance test elements in Table 1, the resistance test elements Rc2, Rs3, Rs4, Rs5 and the capacitance test elements C3, C4 are not included in Table 3.

Each of the TEG blocks 21 to 24 in FIG. 15 includes six test terminals. Each of the test elements included in each TEG block 21 to 24 is connected to at least one of the six test terminals of that TEG block.

This will be described specifically for the TEG blocks 21 and 22. In the TEG block 21, the TFT test element is connected to three test terminals 301a, 301b, 301c of the six test terminals 301a to 301f. The capacitance test element (C2-1) is connected to two test terminals 301e, 301f. The remaining one test terminal 301d is a dummy terminal that is not connected to any test element.

In the TEG block 22, the resistance test element (Rc1-1) is connected to four test terminals 302a, 302b, 302c, 302d of the six test terminals 302a to 302f. The capacitance test element (C1-1) is connected to the remaining two test terminals 302e, 302f.

As shown in FIG. 15, the plurality of test terminals 301a to 301f in the TEG block 21 and the plurality of test terminals 302a to 302f in the TEG block 22 are both arranged in line, and the plurality of test terminals 301a to 301f in the TEG block 21 are arranged at the same pitch and with the same pattern as the plurality of test terminals 302a to 302f in the TEG block 22. In the other TEG blocks 23 and 24 as well, six test terminals are arranged with the same pattern as that of the test terminals 301a to 301f in the TEG block 21. The test terminals in each TEG block 21 to 24 are arranged with the same pattern as that of the test terminals in each TEG block 1 to 13 of the first embodiment.

Hereinafter, a method for measuring characteristics of the test elements in each TEG block described in the first and second embodiment will be described. The test elements are roughly divided into a TFT test element, resistance test elements, and capacitance test elements. The resistance test elements are roughly divided into wiring (sheet) resistance test elements and contact resistance test elements. Hereinafter, a method for measuring characteristics of the TFT test element, the wiring (sheet) resistance test element, the contact resistance test element and the capacitance test element will be sequentially described.

[TFT characteristics measurement of the TFT test element; see the TFT test element in the TEG Block 1 of FIG. 3]

A constant voltage is applied to the test terminal 106a connected to the gate sheet 204 and the test terminal 106c connected to the source sheet 206. A current flowing through the element portion P between the source sheet 206 and the drain sheet 208 (see step 7 in FIG. 7) is measured while sweeping the voltage applied to the gate sheet 204. For example, a voltage of 10 V is applied as a source voltage, and a gate voltage is swept from −20 V to 20 V.

[Resistance measurement of the wiring (sheet) resistance test element; see Rs1 in the TEG Block 5 of FIG. 3]

A constant current of, e.g., 0.1 mA is applied to two test terminals 108a, 108b of the four test terminals 108a, 108b, 108c, 108d connected to the resistance test element (Rs1). A voltage is measured from the inner two test terminals 108b, 108c, thereby measuring the wiring (sheet) resistance of Rs1. For the wiring (sheet) resistance test element, only the resistance of a metal sheet portion to be measured can be obtained by the four-terminal measurement method. For example, in the case where the area of the element portion P of the resistance test element (Rs1) (see FIG. 8A) is four times as large as that of the gate metal sheet to be measured, the metal sheet resistance ($\Omega/\square$) can be obtained by dividing the measurement value by four.

[Resistance measurement of the contact resistance test element; see Rc-1 in the TEG block 2 of FIG. 3]

A constant current of, e.g., 0.1 mA is applied to two test terminals 107a, 107d of the four test terminals 107a, 107b, 107c, 107d connected to the contact resistance test element (Rc1-1). A voltage is measured from the remaining two test terminals 107b, 107c. Thus, the total resistance of the resistance of the element portion P of the test element for drain-gate contact resistance (see FIG. 9C) and two kinds of metal sheet (drain and gate sheet) resistances is obtained. Moreover, measuring the two kinds of metal sheet (drain and gate sheet) resistances by the aforementioned method enables only the resistance of the element portion P of the test element for drain-gate contact resistance to be obtained.

Figure 16A:
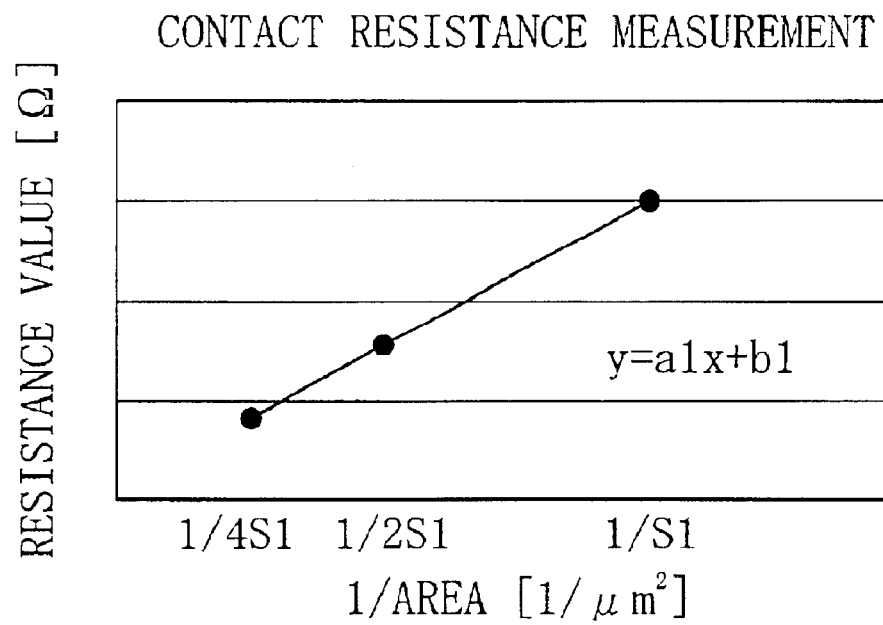
FIG. 16A is a graph showing the relation between a resistance value and a reciprocal of the contact area in the case of the contact resistance measurement.

It is also possible to measure the contact resistance by the same method using contact resistance test elements for measuring the same characteristics but having different areas of the element portion. For example, Rc1-1 in the TEG block 2 and Rc1-2 in the TEG block 3 are contact resistance test elements for measuring the drain-gate contact resistance. However, the area of the element portion P of Rc1-2 is twice as large as that of the element portion P of Rc1-1 (see Table 1). In this case, the contact resistance can be measured based on the respective resistance values of these contact resistance test elements. Given the metal sheet resistance is constant, the resistance value is proportional to the reciprocal of the contact area (the area of the element portion P) (y=a1x+b1) as shown in FIG. 16A. Therefore, the inclination a1 obtained from a regression coefficient can be regarded as contact resistance ($\Omega \cdot \mu m^2$).

[Capacitance measurement of the capacitance test element; see C2-1 in the TEG block 1 of FIG. 3]

A constant voltage of, e.g., 10 V is applied to two test terminals 106e, 106f connected to the capacitance test element (C2-1), and capacitance is measured from these test terminals 106e, 106f. Gate insulation film capacitance (pF/$\mu m^2$) can be obtained by dividing the capacitance value by the area (S2) of the element portion P of the metal sheets vertically interposing the gate insulation film 201 therebetween (i.e., the gate sheet 204 and the source or drain sheet 206, 208) (see FIG. 10B).

Figure 16B:
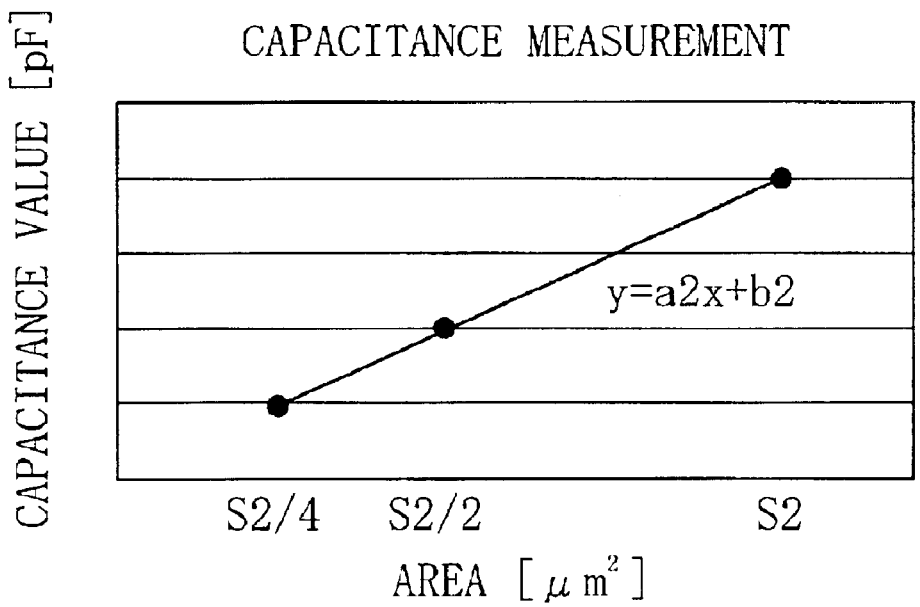
FIG. 16B is a graph showing the relation between a capacitance value and the area of a capacitance test element in the case of the capacitance measurement.

It is also possible to measure the insulation film capacitance by the same method using capacitance test elements for measuring the same characteristics but having different areas of the element portion. For example, C2-1 in the TEG block 1 and C2-2 in the TEG block 3 are capacitance test elements for measuring the gate insulation film capacitance. However, the area of the element portion P of C2-1 is twice as large as that of the element portion P of C2-2 (see Table 1). In this case, the gate insulation film capacitance can be measured based on the respective capacitance values of these capacitance test elements. As shown in FIG. 16B, the capacitance value is proportional to the area (y=a2x+b2). Therefore, the inclination a2 obtained from a regression coefficient can be regarded as gate insulation film capacitance (pF/$\mu m^2$).

Hereinafter, the probe for contact with the test terminals in the first and second embodiments will be described. FIGS.

Figure 17A:
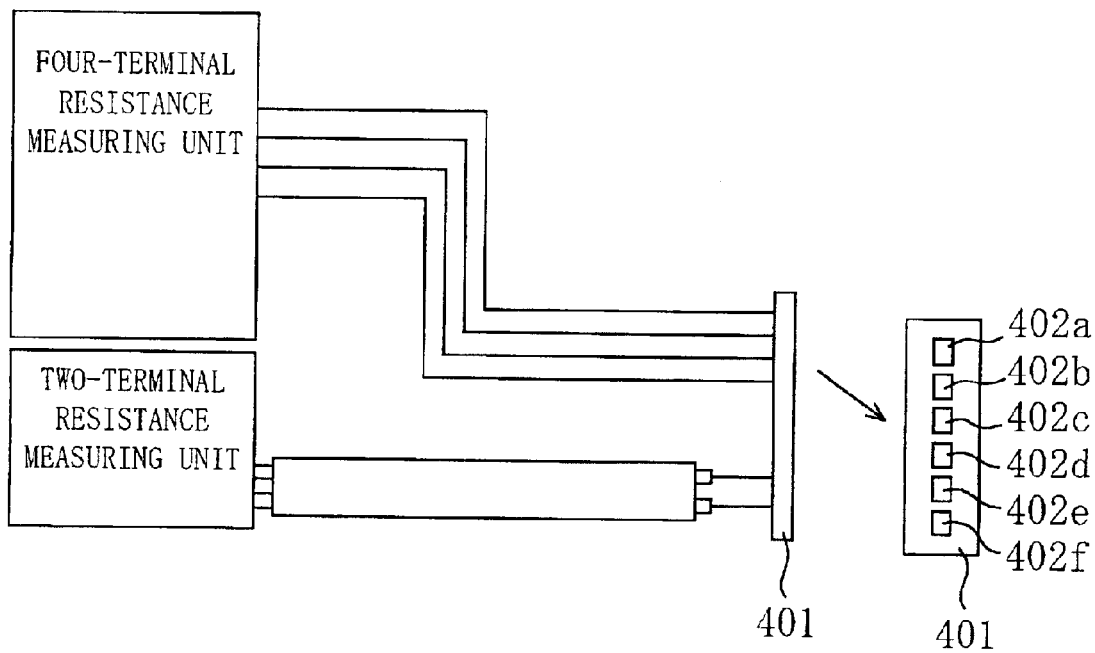
Figure 17B:
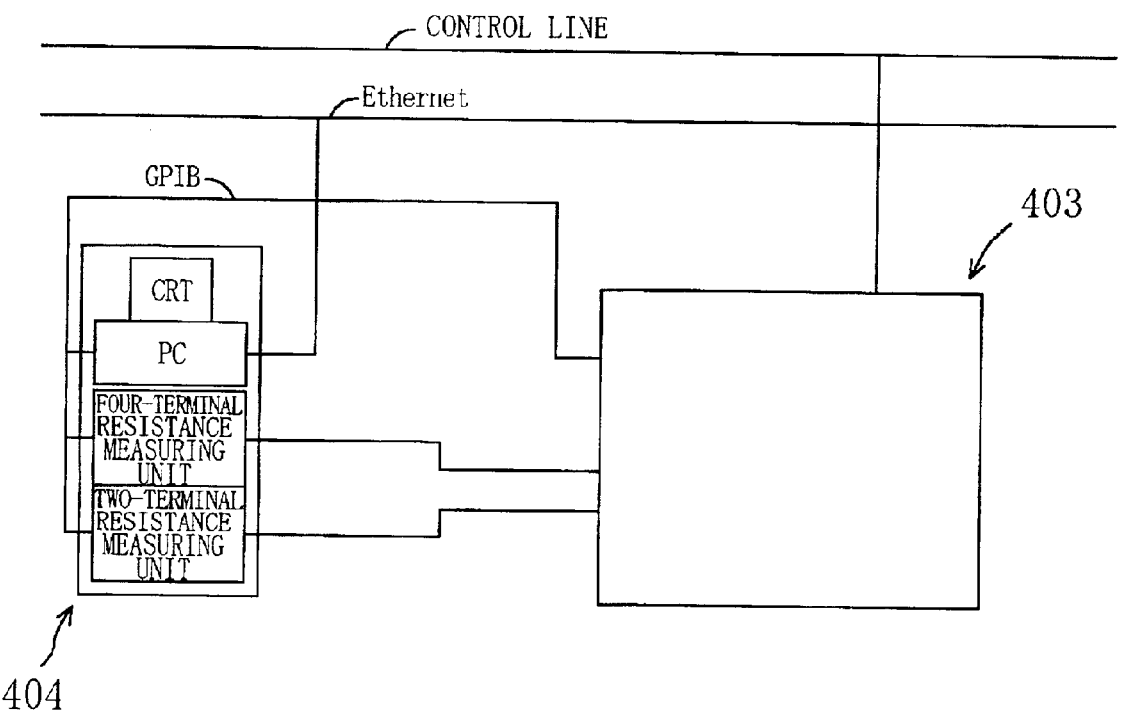

17A and 17B are diagrams schematically illustrating an example of a measuring system including a probe. FIG. 17A is a structural diagram illustrating connection between the probe and two measuring units, and FIG. 17B is a structural diagram illustrating the measuring system. The probe 401 has six contact portions 402a to 402f for contact with the test terminals of the TEG 105 provided on the display device substrate 100. The contact portions 402a to 402f are arranged in line at the same pitch. The contact portions 402a to 402f are arranged with the same pattern as that of the six test terminals included in each of the TEG blocks 1 to 13 and 21 to 24 of the first and second embodiments. Four contact portions 402a, 402b, 402c, 402d of the six contact portions 402a to 402f are connected to a four-terminal resistance measuring unit through cables, and the remaining two contact portions 402e, 402f are connected to a two-terminal capacitance measuring unit through cables.

When the probe 401 is made in contact with, e.g., the test terminals 106a to 106f included in the TEG block 1 in FIG. 3, the contact portions 402a to 402f of the probe 401 simultaneously contact the respective test terminals 106a to 106f. In other words, the contact portions 402a, 402b, 402c of the probe 401 are respectively connected to the test terminals 106a, 106b, 106c connected to the TFT test element, and the contact portions 402e, 402f of the probe 401 are respectively connected to the test terminals 106e, 106f connected to the capacitance test element (C2-1). Accordingly, with one probe contact operation, the test terminals 106a, 106b, 106c connected to the TFT test element are connected to the four-terminal resistance measuring unit, and the terminals 106e, 106f connected to the test element for gate insulation film capacitance (C2-1) are connected to the two-terminal capacitance measuring unit. The TFT characteristics and the gate insulation film capacitance are measured with the contact portions 402a to 402f of the probe 401 being in contact with the respective test terminals 106a to 106f.

The test terminals 107a to 107f in the TEG block 2 are arranged with the same pattern as that of the test terminals 106a to 106f in the TEG block 1. Therefore, the contact portions 402a to 402f of the probe 401 can be simultaneously made in contact with the respective test terminals 107a to 107f. In other words, four contact portions 402a, 402b, 402c, 402d of the probe 401 are respectively connected to the four test terminals 107a, 107b, 107c, 107d connected to the test element for drain-gate contact resistance (Rc1-1), and two contact portions 402e, 402f of the probe 401 are respectively connected to the two test terminals 107e, 107f connected to the test element for capacitance of gate insulation film (with AO) (C1-1). Accordingly, as in the case of the TEG block 1, only one probe contact operation allows the contact portions 402a to 402f of the probe 401 to contact the respective test terminals 107a to 107f simultaneously. The drain-gate contact resistance and the capacitance of the gate insulation film (with AO) can be measured in this state.

The test terminals 301a to 301f in the TEG block 21 of FIG. 15 are arranged with the same pattern as that of the test terminals 106a to 106f in the TEG block 1 of FIG. 3. Accordingly, even in the case of the display device substrate (see FIG. 15) of the second embodiment that is of a different type from the display device substrate 100 of the first embodiment, the contact portions 402a to 402f of the probe 401 can be simultaneously made in contact with the test terminals 301a to 301f with one probe contact operation in order to measure the TFT characteristics and the gate insulation film capacitance.

The measuring system of FIG. 17B is incorporated into the production line for manufacturing at least two different types of display devices, and is intended to evaluate various characteristics of a plurality of TFT substrates formed on a mother substrate. The measuring system is mainly comprised of a prober 403 and a tester 404 including a four-terminal resistance measuring unit and a two-terminal capacitance measuring unit. Information is transmitted between the prober 403 and the tester 404 through a GPIB (general-purpose interface bus). The prober 403 is connected to a control line so that information is transmitted therebetween in order to convey a cassette containing mother substrates to be measured to the measuring system and to convey the cassette containing the measured mother substrates to the next process both in an automated manner. The tester 404 is connected to the Ethernet so that information is transmitted between the tester 404 and other systems in the production line.

The prober 403 loads a mother substrate from a cassette (not shown) containing a plurality of mother substrates (not shown). According to the type of the loaded mother substrate, the prober 403 moves the probe (not shown in FIG. 17B) to the position of the TEG provided on a TFT substrate and makes the probe in contact therewith. After completion of the measurement, the prober 403 unloads the mother substrate back into the cassette. The prober 403 has a recipe corresponding to a cassette ID. The cassette ID includes information about a model. The number of TFT substrates on a mother substrate of each model and the position of the TEG are set in the recipe. For example, in the case where a mother substrate of a particular model has twelve TFT substrates formed thereon and each TFT substrate includes four TEG blocks, the total number of TEG blocks on the mother substrate is 48. In this case, the position of each TEG block on the mother substrate is set in the recipe.

In addition to the four-terminal resistance measuring unit and the two-terminal capacitance measuring unit, the tester 404 includes a personal computer (PC) for recording and processing information, and a display (CRT (cathode ray tube)) for displaying the information processed by the PC. The tester 404 measures characteristics of the test elements on the measurement conditions corresponding to each TEG, and evaluates characteristics on a TFT substrate-by-TFT substrate basis. The tester 404 has a recipe corresponding to a cassette ID. The determination conditions, substrate conditions and measurement conditions are set in the recipe.

The determination conditions include the TEG structure in each TFT substrate, which is determined on a model-by-model basis. For example, for the TFT substrate having the TEG blocks 21 to 24 in Table 3, the number of TEG blocks (four in Table 3), characteristics to be measured in each TEG block by the four-terminal resistance measuring unit and the two-terminal capacitance measuring unit (TFT characteristics and gate insulation film capacitance in the TEG block 21 of Table 3), and the like are set as the determination conditions. In addition, the allowable limit of the characteristics for determining whether the measurement value is acceptable or not is also set as the determination conditions.

The substrate conditions include the number of substrates to be measured in a mother substrate. For example, in the case where a mother substrate of a particular model has twelve TFT substrates formed thereon, "12" is set as the substrate conditions.

The measurement conditions include conditions for the test elements to be measured. For example, a voltage to be applied to the gate terminal and the source terminal is set for the TFT test element, a current to be applied is set for the resistance test element, and the area of the element portion of the contact resistance test element or the capacitance test element. Thus, detailed conditions are set for each test element.

Hereinafter, the flow (flowchart) of the measurement by the measuring system in FIG. 17 will be described with reference to FIG. 18.

When a cassette containing mother substrates to be measured is moved to a measurement port (not shown) of the prober 403 (S1), the prober 403 reads the cassette ID attached to the cassette by using an optical reader (not shown) or the like (S2). The cassette ID thus read is transmitted to the tester 404 through the GPIB. The prober 403 reads the recipe setting corresponding to the cassette ID, and specifies the model of the mother substrates contained in the cassette (S3). The prober 403 then takes a mother substrate out of the cassette (S4).

The prober 403 reads a substrate number attached to the mother substrate, and transmits the substrate number to the tester 404 (S5). The prober 403 moves the probe 401 to the position (coordinates) of a TEG block to be measured on the mother substrate (S6), and makes the contact portions 402a to 402f of the probe 401 in contact with a plurality of test terminals in the TEG block simultaneously (S7). For example, when each mother substrate contained in the cassette is a mother substrate having twelve display device substrates 100 of the first embodiment formed thereon, the prober 403 moves the probe 401 to the position (coordinates) of the TEG block 1 on the mother substrate so that the probe 401 contacts the test terminals 106a to 106f of the TEG block 1 in the first display device substrate 100 on the mother substrate. At this time, the six contact portions 402a to 402f of the probe 401 are made in contact with the six test terminals 106a to 106f in the TEG block 1, respectively.

The prober 403 transmits the position (coordinates) of the TEG block to be measured to the tester 404 (S8). The tester 404 measures characteristics of the test elements in the TEG block based on the recipe setting corresponding to the cassette ID. For example, in the case of the TEG block 1, the tester 404 measures the respective characteristics of the TFT test element and the capacitance test element (C2-1). When the tester 404 notifies the prober 403 of completion of the measurement, the prober 403 then separates the contact portions 402a to 402f of the probe 401 away from the test terminals in the TEG block, and determines whether or not there is another TEG block to be measured (S9). If there is another TEG block to be measured, the probe 401 is then moved to the position of a TEG block to be measured. Thus, all the TEG blocks on the mother substrate are sequentially measured (S6 to S9). For example, when measurement of the TEG block 1 is completed, characteristics of the TEG blocks 2 to 13 are sequentially measured. When measurement of the first display device substrate 100 on the mother substrate is completed, characteristics of the second to twelfth display device substrates 100 on the mother substrate are sequentially measured on a TEG block-by-TEG block basis.

When there is no more TEG block to be measured, for example, when measurement of the twelve display device substrates 100 on the mother substrate is completed, the prober 403 notifies the tester 404 of completion of measurement of the mother substrate (S10). The tester 404 then analyses the measurement values, and displays on the CRT the data of the mother substrate such as the measurement values of the test elements in each TEG block. If the measurement values of the test elements exceed the allowable limit, the mother substrate having defective characteristics can be removed from the production line manually or automatically. The prober 403 determines whether or not there is another mother substrate to be measured (S11). If there is another mother substrate to be measured, that mother substrate is taken out of the cassette, and the test elements in the TEG blocks on the mother substrate are sequentially measured on a TEG block-by-TEG block basis (S4 to S10).

If there is no more mother substrate to be measured, the prober 403 notifies the tester 404 of completion of the measurement of all mother substrates in the cassette (S12). The prober 403 then determines whether or not there is another cassette to be measured. If there is another cassette to be measured, the prober 403 reads the cassette ID attached to that cassette, and repeats the aforementioned steps (S2 to S12) (S13). For example, in the case where a cassette contains mother substrates each having a plurality of display device substrates of the second embodiment formed thereon, the aforementioned steps are repeated for each of the plurality of display device substrates, whereby characteristics of the test elements in each TEG block 21 to 24 are measured sequentially.

As has been described above, the measuring system of FIG. 17 is capable of measuring a plurality of TEG blocks in a display device substrate such as a TFT substrate without replacing the probe 401. In other words, the measuring system of FIG. 17 is capable of successively measuring the characteristics of the test elements on a TEG block-by-TEG block basis without replacing the probe 401. Moreover, this measuring system is capable of measuring the characteristics in an automated manner, improving production efficiency. This measuring system is also capable of successively measuring a plurality of mother substrates in the same cassette (i.e., the same lot) without replacing the probe 401. In the case where a plurality of test terminals are arranged with a common pattern in at least two different types of display device substrates, for example, in the case where a plurality of test terminals in each TEG block 1 to 13, 21 to 24 are arranged with the same pattern like the display device substrates of the first and second embodiments, this measuring system is capable of successively measuring different types of mother substrates of various models without replacing the probe 401.

Every mother substrate subjected to the aforementioned characteristics evaluation process is cut into a prescribed number of display device substrates. At this time, the TEG blocks on the mother substrate may be removed. However, the TEG blocks may be left unless causing any inconvenience. After the mother substrate is cut into a prescribed number of display device substrates, the display device circuit is subjected to a known alignment-film processing, and the liquid crystal material is interposed between counter substrates, whereby the LCD is fabricated.

According to the present invention, required characteristics evaluation can be efficiently conducted in, e.g., the TFT manufacturing process regardless of the type of substrate to be measured. This enables processing defects resulting from variation or troubles in the manufacturing process to be found accurately in early stages, allowing for reduced outflow of the defective substrates. Thus, the display device can be efficiently manufactured. Moreover, the measuring system of the present invention is capable of measuring the characteristics in an automated manner, allowing for improved production efficiency.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true sprit and scope of the invention.

What is claimed is:

1. A method for manufacturing a display device using a production line for manufacturing at least two different types of display devices, the method comprising:

fabricating a circuit substrate including a display device circuit of the display device and a plurality of test elements for evaluating characteristics of a circuit element of the display device circuit; and evaluating the characteristics of the circuit element, the evaluating step including a substep of measuring characteristics of the test elements formed on the circuit substrate, wherein each of the plurality of test elements is connected to at least one of a plurality of test terminals arranged with a common pattern in the at least two different types of display devices, and the substep of measuring is conducted with causing a common probe to be in contact with the at least one test terminal regardless of the type of the display device.

2. The method according to claim 1, wherein the circuit substrate includes a first test element group including at least two test elements for evaluating different characteristics, the first test element group is connected to at least one of a plurality of first test terminals, and the plurality of first test terminals being included in the plurality of test terminals arranged with the common pattern.

3. The method according to claim 2, wherein the circuit substrate further includes a second test element group including at least two additional test elements for evaluating different characteristics, the second test element group is connected to at least one of a plurality of second test terminals arranged with the same pattern as that of the plurality of first test terminals, and in the substep of measuring the substep of causing the common probe to be in contact with the at least one of the plurality of first test terminals is conducted independently of causing the common probe in contact with the at least one of the plurality of second test terminals.

4. The method according to claim 2, wherein the at least two test elements include a resistance test element and a capacitance test element, the plurality of first test terminals are six first test terminals, the resistance test element is connected to four of the six first test terminals, and the capacitance test element is connected to the remaining two first test terminals of the six first test terminals.

5. The method according to claim 4, wherein the circuit substrate further includes a second test element group including at least two additional test elements for evaluating different characteristics, the at least two additional test elements include an additional resistance test element and an additional capacitance test element, and the second test element group is connected to a plurality of second test terminals arranged with the same pattern as that of the plurality of first test terminals.

6. The method according to claim 5, wherein, in the substep of measuring, the substep of causing the common probe to be in contact with the plurality of first test terminals is conducted independently of causing the common probe to be in contact with the plurality of second test terminals.

7. The method according to claim 1, wherein the step of evaluating the characteristics of the circuit element includes specifying a type of the circuit substrate out of the at least two different types, obtaining information on measurement conditions and arrangement of the plurality of test terminals according to the specified type of circuit substrate out of the at least two different types, and moving the common probe relative to the circuit substrate based on the obtained information on the measurement conditions and arrangement so that the same common probe can be used for evaluating different characteristics of the different substrate types.

8. The method according to claim 1, wherein the step of fabricating the circuit substrate is a step of forming a plurality of circuit substrates on a mother substrate, and the step of evaluating the characteristics is sequentially conducted for the plurality of circuit substrates.

9. The method according to claim 3, wherein the first test element group and the second test element group include in common a test element for measuring the same characteristics, each of the test elements includes an element portion to be measured and a wiring portion for connecting the element portion to the test terminal, and the respective element portions of the test elements for measuring the same characteristics have different areas, the method further comprising the step of:

calculating a regression coefficient from respective measurement results of the test elements and the respective areas of the element portions.

10. A display device mother substrate, comprising:

a display device circuit of a display device; and a plurality of test elements for evaluating characteristics of a circuit element forming the display device circuit, wherein the plurality of test elements include at least a first test element group and a second test element group each including a resistance test element and a capacitance test element that are arranged adjacent to each other, and the first test element group is connected to at least one of a plurality of first test terminals arranged with a prescribed pattern, and the second test element group is connected to at least one of a plurality of second test terminals arranged with the same pattern as that of the plurality of first test terminals.

11. The display device mother substrate according to claim 10, wherein the plurality of first test terminals are six first test terminals, the resistance test element is connected to four of the six first test terminals, and the capacitance test element is connected to the remaining two first test terminals of the six first test terminals.

12. A measuring system for measuring characteristics of the plurality of test elements included in the display device mother substrate according to claim 10 or 11, comprising:

a probe including a plurality of contact portions arranged with the same pattern as that of the plurality of first test terminals on the display device substrate;

a means for reading information attached to a cassette that contains a plurality of mother substrates each having a plurality of display device substrates formed thereon;

a means for taking a mother substrate out of the cassette based on the information read by the reading means;

a first determination means for determining whether or not there is any test element on the mother substrate, which has not been measured;

a means for moving the probe relative to the test element on the display device substrate according to a type of the mother substrate, when the first determination means determines that there is a test element that has not been measured;

a means for making the plurality of contact portions of the probe in contact with a plurality of test terminals including the terminal connected to the test element, and measuring characteristics of the test element;

a second determination means for determining whether or not the cassette contains any mother substrate that has not been measured, when the first determination means determines that there is not any test element that has not been measured;

a means for taking the mother substrate that has not been measured out of the cassette, when the second determination means determines that the cassette contains a mother substrate that has not been measured;

a third determination means for determining whether there is any cassette that has not been measured, when the second determination means determines that the cassette does not contain any mother substrate that has not been measured; and a means for moving the cassette that has not been measured so as to allow the reading means to read the information, when the third determination means determines that there is a cassette that has not been measured.

13. The method according to claim 1, wherein the circuit substrate includes a first test element group (TEG) including first and second different test elements for evaluating first and second different characteristics of the circuit element, and a second test element group (TEG) including third and fourth different test elements for evaluating third and fourth different characteristics of the circuit element, and wherein each of the first and second TEGs has a common pattern of test terminals.

14. A display device substrate, comprising:

a display device circuit of a display device; and a plurality of test elements for evaluating characteristics of a circuit element forming the display device circuit, wherein the plurality of test elements include at least a first test element group including a TFT test element and a capacitance test element that are arranged adjacent to each other, and a second test element group including a resistance test element and a capacitance test element that are arranged adjacent to each other, and the first test element group is connected to at least one of a plurality of first test terminals arranged with a prescribed pattern, and the second test element group is connected to at least one of a plurality of second test terminals arranged with the same pattern as that of the plurality of first test terminals.

15. The display device substrate according to claim 14, wherein the plurality of first test terminals is composed of six test terminals, and one of the first test terminals is a dummy terminal that is not connected to any test element and capacitance test element.

16. The display device substrate according to claim 14, wherein a mother substrate has a plurality of display device substrates.

17. A display system comprising:

a display device circuit of a display device and a plurality of test elements for evaluating characteristics of a circuit element forming the display device circuit, wherein the plurality of test elements include a first test element group including at least two test elements for evaluating different characteristics from each other, and a second test element group including at least two additional test elements for evaluating different characteristics from each other, the first test element group is connected to at least one of a plurality of first test terminals arranged with a predetermined pattern, and the second test element group is connected to at least one of a plurality of second test terminals arranged with the sane pattern as that of the plurality of first test terminals, and the first test element group and the second test element group include in common a test element for measuring the same characteristics, each of the test elements includes an element portion to be measured and a wiring portion for connecting the element portion to the test terminal, the respective element portions of the test elements for measuring the same characteristics have different areas, and means for calculating a regression coefficient from respective measurement results of the test elements and the respective areas of the element portions.

18. The display system according to claim 17, wherein a mother substrate has a plurality of display device substrates.

* * * * *